(12) United States Patent
Yuen et al.

(10) Patent No.: US 10,380,444 B2
(45) Date of Patent: Aug. 13, 2019

(54) 3D MASK FACE ANTI-SPOOFING WITH REMOTE PHOTOPLETHYSMOGRAPHY

(71) Applicant: Hong Kong Baptist University, Hong Kong (HK)

(72) Inventors: Pong Chi Yuen, Hong Kong (HK); Siqi Liu, Hong Kong (HK); Shengping Zhang, Harbin (CN); Guoying Zhao, Oulu (FI)

(73) Assignee: Hong Kong Baptist University, Hong Kong (HK)

( * ) Notice: Subject to any disclaimer, the term of this patent is extended or adjusted under 35 U.S.C. 154(b) by 0 days.

(21) Appl. No.: 15/649,647

(22) Filed: Jul. 14, 2017

(65) Prior Publication Data
US 2019/0014999 A1 Jan. 17, 2019

(51) Int. Cl.
*G06K 9/00* (2006.01)

(52) U.S. Cl.
CPC ..... *G06K 9/00906* (2013.01); *G06K 9/00255* (2013.01); *G06K 2009/00939* (2013.01)

(58) Field of Classification Search
USPC ......................................................... 382/118
See application file for complete search history.

(56) References Cited

U.S. PATENT DOCUMENTS

2016/0140719 A1* 5/2016 Lucey ...................... G06T 7/62
382/154

OTHER PUBLICATIONS

Nowara, Ewa Magdalena, "PPGSecure: Biometric Presentation Attack Detection Using Photopletysmograms", May 30-Jun. 3, 2017, 2017 IEEE 12th International Conference on Automatic Face & Gesture Recognition.*

Erdogmus, N. et. al., "Spoofing face recognition with 3D masks", IEEE Transactions on Information Forensics and Security, 2014, 9(7), p. 1084-1097.

Verkruysse, W. et. al., "Remote plethysmographic imaging using ambient light", Optics Express, 2008, 16(26), p. 21434-21445.

Xiaobai Li et. al., "Remote heart rate measurement from face videos under realistic situations", IEEE Conference on Computer Vision and Pattern Recognition, 2014, p. 4264-4271.

G. Lempe et. al., "Region of Interest selection for remote photoplethysmography," Bildverarbeitung für die Medizin, 2013, p. 99-103.

Wang, T.et al., "Face liveness detection using 3D structure recovered from a single camera", International Conference on Biometrics (ICB), 2013, p. 1-6.

Poh, M.Z. et al., Non-contact, automated cardiac pulse measurements using video imaging and blind source separation, Optics Express, 2010, 18(10), p. 10762-10774.

Lewandowska, M. et al., "Measuring pulse rate with a webcam a non-contact method for evaluating cardiac activity", Federated Conference on Computer Science and Information Systems (FedCSIS), 2011, p. 405-410.

(Continued)

*Primary Examiner* — Justin P. Misleh
(74) *Attorney, Agent, or Firm* — Idea Intellectual Limited; Margaret A. Burke; Sam T. Yip

(57) ABSTRACT

The present invention relates to 3D mask face anti-spoofing with remote photoplethysmography. More particularly, it relates to a local rPPG correlation model to extract discriminative and robust local rPPG signal patterns so that an imposter can better be detected regardless of the material and quality of the mask.

5 Claims, 24 Drawing Sheets

(56) References Cited

OTHER PUBLICATIONS

Gerard de Haanet al., "Robust pulse rate from chrominance-based rPPG", IEEE Trans. Bio-Med. Eng., 2013, 60(10), p. 1878-2886.
Kumar, M. et al., "DistancePPG: robust non-contact vital signs monitoring using a camera", Biomed. Opt. Express, 2015, 6(5), p. 1565-1588.
Cox, M. et al., "CSIRO face analysis SDK", Brisbane, Australia, 2013, p. 1-9.
Tiago de Freitas Pereira et al., "Can face anti-spoofing countermeasures work in a real world scenario?", International Conference on Biometrics (ICB), 2013, p. 1-8.
Wen, D. et al., "Face spoof detection with image distortion analysis", IEEE Transactions on Information Forensics and Security, 2015, 10(4), p. 746-761.
Tiago de Freitas Pereira et al., "Face liveness detection using dynamic texture", EURASIP Journal oon Image and Video Processing, 2014, 2014(2), p. 1-15.
Dustin Boswell, Introduction to Support Vector Machines, 2002, p. 1-15.
Radial-Basis-Function kernel.
Siqi Liu et al., "3D Mask Face Anti-spoofing with Remote Photoplethysmography", ECCV, 2016, p. 85-100.

\* cited by examiner

US 10,380,444 B2

3D MASK FACE ANTI-SPOOFING WITH REMOTE PHOTOPLETHYSMOGRAPHY

FIELD OF THE INVENTION

The present invention relates to 3D mask face anti-spoofing method with remote photoplethysmography (rPPG). More particularly, it relates to a local remote photoplethysmography (rPPG) correlation model to extract discriminative local rPPG signal patterns so that an imposter can better be detected regardless of the material and quality of the mask.

BACKGROUND OF THE INVENTION

Face recognition has been widely employed in a variety of applications. Like any other biometric modality, a critical concern in face recognition is to detect spoofing attack. In the past decade, photos and videos are two popular media of carrying out spoofing attacks and varieties of face anti-spoofing algorithms have been proposed and encouraging results have been obtained. Recently, with the rapid development of 3D reconstruction and material technologies, 3D mask attack becomes a new challenge to face recognition since affordable off-the-shelf masks have been shown to be able to spoof existing face recognition system. Unlike the success in traditional photo or video based face anti-spoofing, very few methods have been proposed to address 3D mask face anti-spoofing. To the best of the inventors' knowledge, most existing face anti-spoofing methods are not able to tackle this new attack, since 3D masks have similar appearance and geometry properties as live faces.

As known in the general common knowledge, texture-based methods are the few effective approaches that have been evaluated on 3D mask attack problem. Experimental results demonstrate their discriminative ability on 3D mask attack database and morpho datasets with different classifiers. Through concatenation of different local binary pattern settings, multi-scale local binary pattern can effectively capture the subtle texture differences between genuine and masked faces and achieves 99.4% area under the curve on 3D mask attack database dataset. Although the results are promising, the problem of the cross-dataset (where training and testing data are selected from different datasets) scenario remains open. From the application perspective, it is essential for a face anti-spoofing method to be effective and robust to different mask types and video qualities. In fact, as known in the general common knowledge, the present problem cannot be well generalized under inter-test (cross-dataset) protocol. This is because of the over-fitting problem of its intrinsic data-driven nature. Also, since texture-based methods rely on the appearance differences between 3D masks and genuine faces, it may not work for the super realistic masks that have imperceptible difference with the genuine face, e.g., prosthetics makeup. Therefore, there is a need to provide a more effective face anti-spoofing method to identify super realistic masks or partially masked faces.

SUMMARY OF THE INVENTION

Accordingly, it is an objective of the present invention to provide a method of 3D mask face anti-spoofing with remote photoplethysmography (rPPG). More particularly, it relates to a local rPPG correlation model to extract discriminative local rPPG signal patterns so that an imposter can better be detected regardless of the material and quality of the mask.

In a first aspect of the present invention, there is provided a method and an apparatus for a 3-dimensional mask face anti-spoofing of a subject of interest comprising: capturing a video of a face of the subject of interest; extracting local remote photoplethysmography signals from the captured video of the face of the subject of interest to produce extracted local remote photoplethysmography signals; modelling the extracted local remote photoplethysmography signals through cross-correlation to produce a robust cross-correlation model of the extracted local remote photoplethysmography signals for 3-dimensional mask face anti-spoofing; learning a confidence map based on the extracted local remote photoplethysmography signals; and classifying the captured video of the face of the subject based on the cross-correlation model of the extracted local remote photoplethysmography signals and the confidence map to determine if a 3-dimensional mask face is used.

In a first embodiment of the first aspect of the present invention, there is provided a method and an apparatus for a 3-dimensional mask face anti-spoofing of a subject of interest wherein the extraction of the local remote photoplethysmography signals comprising: detecting face landmarks on the captured video of the face of the subject; dividing the captured video of the face of the subject into one or more local regions; and extracting local remote photoplethysmography signals from said one or more local regions.

In a second embodiment of the first aspect of the present invention, there is provided a method and an apparatus for a 3-dimensional mask face anti-spoofing of a subject of interest wherein the cross-correlation modelling of the extracted local remote photoplethysmography signals comprising modelling the extracted local remote photoplethysmography signals through a union of similarity of possible signals combination defined as $$x = U_{i,j=1,\ldots,N, i \neq j}\, \rho(s_i, s_j)$$

where $\rho(s_i, s_j)$ is a similarity between two signals $s_i$ and $s_j$, and union U is a concatenation operator, and the similarity $\rho(s_i, s_j)$ is the maximum value of cross-correlation spectrum of two local remote photoplethysmography signals, and wherein $$\rho(s_i, s_j) = \max |\mathcal{F}\{s_i \star s_j\}|$$

where $\mathcal{F}$ is Fourier transform and $*$ is a cross-correlation operator.

In a third embodiment of the first aspect of the present invention, there is provided a method and an apparatus for a 3-dimensional mask face anti-spoofing of a subject of interest wherein the learning of the confidence map comprising: emphasizing local regions of the video of the face which contains strong remote photoplethysmography signals; deemphasizing local regions of the video of the face which contain weak remote photoplethysmography signals; obtaining a stableness pattern of local remote photoplethysmography signals extracted from one or more training subjects; assigning a reliability measurement to each local regions of the video of the face according to the stableness pattern; producing a confidence map p of the extracted local remote photoplethysmography signals from the remote photoplethysmography signals of the one or more training subjects and the subject of interest.

In a fourth embodiment of the first aspect of the present invention, there is provided a method and an apparatus for a 3-dimensional mask face anti-spoofing of a subject of interest wherein the classification of the cross-correlation model of the extracted local remote photoplethysmography signals comprising: employing a joint confidence q to adjust interference from feature representations of corrupted extracted local remote photoplethysmography signals.

In a fifth embodiment of the first aspect of the present invention there is provided a method and an apparatus for a 3-dimensional mask face anti-spoofing of a subject of interest wherein the learning of the confidence map is performed on local remote photoplethysmography signals extracted from one or more of training subjects.

In a sixth embodiment of the first aspect of the present invention there is provided a method and an apparatus for a 3-dimensional mask face anti-spoofing of a subject of interest wherein given the confidence map p of extracted local remote photoplethysmography signals is produced, the confidence of x is measured by computing each dimensions' reliability.

Those skilled in the art will appreciate that the invention described herein is susceptible to variations and modifications other than those specifically described.

The present invention includes all such variation and modifications. The invention also includes all of the steps and features referred to or indicated in the specification, individually or collectively, and any and all combination or any two or more of the steps or features.

Throughout this specification, unless the context requires otherwise, the word "comprise" or variations such as "comprises" or "comprising", will be understood to imply the inclusion of a stated integer or group of integers but not the exclusion of any other integer or group of integers. It is also noted that in this disclosure and particularly in the claims and/or paragraphs, terms such as "comprises", "comprised", "comprising" and the like can have the meaning attributed to it in U.S. Patent law; e.g., they can mean "includes", "included", "including", and the like; and that terms such as "consisting essentially of" and "consists essentially of" have the meaning ascribed to them in U.S. Patent law, e.g., they allow for elements not explicitly recited, but exclude elements that are found in the prior art or that affect a basic or novel characteristic of the invention.

Furthermore, throughout the specification and claims, unless the context requires otherwise, the word "include" or variations such as "includes" or "including", will be understood to imply the inclusion of a stated integer or group of integers but not the exclusion of any other integer or group of integers.

Other definitions for selected terms used herein may be found within the detailed description of the invention and apply throughout. Unless otherwise defined, all other technical terms used herein have the same meaning as commonly understood to one of ordinary skill in the art to which the invention belongs.

Other aspects and advantages of the invention will be apparent to those skilled in the art from a review of the ensuing description.

BRIEF DESCRIPTION OF DRAWINGS

The above and other objects and features of the present invention will become apparent from the following description of the invention, when taken in conjunction with the accompanying drawings, in which.

DETAILED DESCRIPTION OF THE INVENTION

Figure 1A:
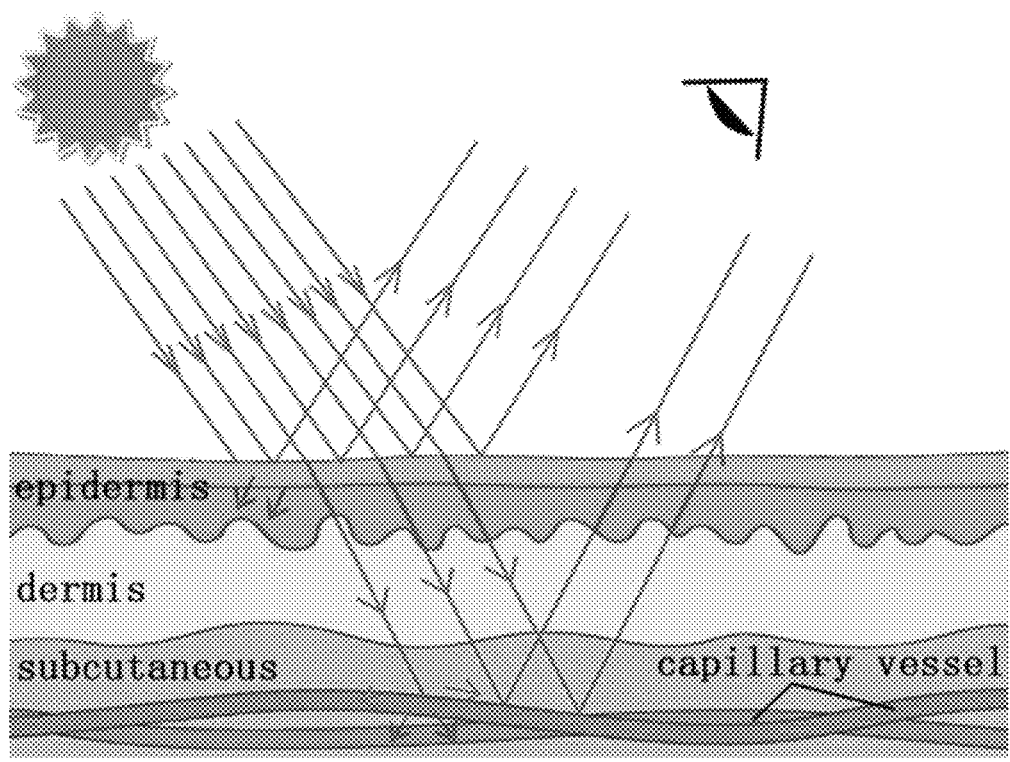
FIG. 1a shows the effect of remote photoplethysmography (rPPG) on a normal unmasked face or a genuine face.

The present invention is not to be limited in scope by any of the specific embodiments described herein. The following embodiments are presented for exemplification only.

To address the aforementioned limitations, the present invention provides a method for 3D mask face anti-spoofing, from a new perspective, using heart rate signal as a more intrinsic cue for mask detection. Photoplethysmography (PPG), as one of the general ways for heart rate monitoring, could be used to detect this intrinsic liveness information. However, it is hard to adapt PPG into existing systems, since PPG extracts heartbeat from color variation of blood through pulse oximeter in a contact way. In recent years, based on the same principle, researchers have found that the vital signal can be detected remotely through web camera. This new technique is named as remote Photoplethysmography (rPPG). Due to the non-contact property, rPPG could be a possible solution for the 3D mask face anti-spoofing. The principle is presented in FIGS. 1a and 1b, wherein rPPG detects vascular blood flow based on the absorption and reflection of light passing through human skin. For a normal unmasked face or genuine face (FIG. 1a), although part of the light is reflected or absorbed by the semi-transparent human skin, heartbeat signal can still be detected from the subtle blood color variation. Sufficient light penetrates the semi-transparent skin tissue and interact with blood vessels. rPPG signal can go through skin and be detected by RGB camera. For a masked face in FIG. 1b, the light source needs to penetrate a layer of painted plastic and a layer of skin before interacting with the blood. Such a small amount of energy results in a very noisy rPPG signal that is almost impossible to detect the blood volume flows. The mask material blocks large portion of the light that the skin should absorb. Light source needs to penetrate a layer of painted plastic and a layer of skin before interacting with the blood. Remain rPPG signals is too weak to be detected.

Based on this principle, the present invention provides a method using rPPG for 3D mask face anti-spoofing. An intuitive solution is extracting global heartbeat signal through rPPG from a video of a face as the vital sign. Heartbeat signal or rPPG signal is high in amplitude on a genuine face and very low in amplitude on a masked face. However, extraction of global rPPG signal may not be able to achieve good performance, since interference like poor video quality; low exposure conditions, light change or head motion may conceal the subtle heart rate signal and introduce false rejection error (Section 3—Local rPPG Work for 3D Mask Face Anti-spoofing has detailed analysis). Moreover, extraction of global rPPG signal lacks spatial information which may lead to false accept error since rPPG signal may still be detectable on partially masked face. As such, the present invention includes rPPG from a local perspective. Common general knowledge has indicated that strength of rPPG signal varies at different local face regions and forms a stableness pattern among different people. Note that the strength of a signal can be interpreted by signal to noise ratio (SNR) value. Meanwhile, based on inventors' observation, the local rPPG strength forms a stableness spatial pattern among different users. Therefore, the local rPPG signals is used to form a discriminative pattern for 3D mask detection.

1. Face Anti-Spoofing

Existing face anti-spoofing methods can be mainly divided into two categories: appearance based approaches and motion based approaches. As the appearance of printed photos and videos may differ from real faces, texture-based approaches have been used to detect printed or displayed artifacts and achieve encouraging results. Multi-Scale LOCAL BINARY PATTERN concatenates different LOCAL BINARY PATTERN settings and achieves promising performance on 3D mask detection. While the results are promising in the above methods, recent studies indicate that they cannot generalize well in the cross-dataset scenario. Deep learning based methods also achieve encouraging results on 3D Mask Attack Database. But they may also face the same problem due to the intrinsic data-driven nature. Image distortion analysis (IDA) based approaches perform well in the cross-dataset scenario. But for 3D mask attack, these methods may not stand as the masked face has no relation to the video or image quality.

Motion-based approaches use unconscious face motion or human-computer interaction (HCI) to detect photo and video attacks through user's response (e.g., detect whether the user blinks unconsciously or being instructed to do so. These approaches are particularly effective against photo and stationary screen attacks. However, when facing mask attack exposes eyes or mouth, or video attack contents face motion, they may not be able to detect the masked face.

There are also other approaches based on different parameters, which can achieve the desired performance under various assumptions. For example, in Wang, T., Yang, J., Lei, Z., Liao, S., Li, S. Z.: Face liveness detection using 3D structure recovered from a single camera. In: 2013 International Conference on Biometrics (ICB), pp. 1-6. IEEE (2013), it solves the problem through spoofing medium shape (context). These methods may not be able to tackle mask attack since 3D mask faces have the same geometric property as real faces. Multi-spectrum analysis may work since it relies on differences in frequency responses of 3D mask faces and real faces. However, it requires specific equipment to capture the invisible light which may not be economical for a face recognition system.

2. Remote Photoplethysmography rPPG is a new research topic in medical field and only few methods are proposed in recent years. Verkruysse, W., Svaasand, L. O., Nelson, J. S.: Remote plethysmographic imaging using ambient light. Opt. Express 16(26), 21434 (2008) is one of the early work that evaluates rPPG under ambient light. Poh, M. Z., McDuff, D. J., Picard, R. W.: Non-contact, automated cardiac pulse mea-surements using video imaging and blind source separation. Opt. Express 18(10), 10762-10774 (2010) and Lewandowska, M., Ruminski, J., Kocejko, T., Nowak, J.: Measuring pulse rate with a webcam a non-contact method for evaluating cardiac activity. In: 2011 Federated Conference on Computer Science and Information Systems (FedCSIS), pp. 405-410. IEEE (2011) propose to use blind source separation (BSS) techniques, e.g., independent component analysis (ICA) and principle component analysis (PCA), to extract rPPG signals from a video of a face. Others have observed that strength of rPPG varies in different facial parts. de Haan and Jeanne models the physical process of rPPG to achieve motion robustness in de Haan, G., Jeanne, V.: Robust pulse rate from chrominance-based rPPG. IEEE Trans. Bio-Med. Eng. 60(10), 2878 (2013). Li et al. builds a framework that contains illumination rectification and motion elimination to achieve good performance in realistic situations in Li, X., Chen, J., Zhao, G., Pietikainen, M.: Remote heart rate measurement from face videos under realistic situations. In: 2014 IEEE Conference on Computer Vision and Pattern Recognition, pp. 4264-4271, June 2014.

3. Local rPPG Work for 3D Mask Face Anti-Spoofing 3.1 Analysis of rPPG Signal on Live and Masked Face As shown in FIG. 1a, light illuminates capillary vessel and rPPG signal penetrates skin to be observed. Thus, the observed signal from a live face $\hat{s}_l$ can be modeled as follows, $$\hat{s}_l = T_s Is + \epsilon \qquad (1)$$

where s is the raw rPPG signal from capillary vessels, $T_s$ is the transmittance of skin and I is the mean intensity of facial skin under ambient light. ε is the environmental noise.

Figure 1B:
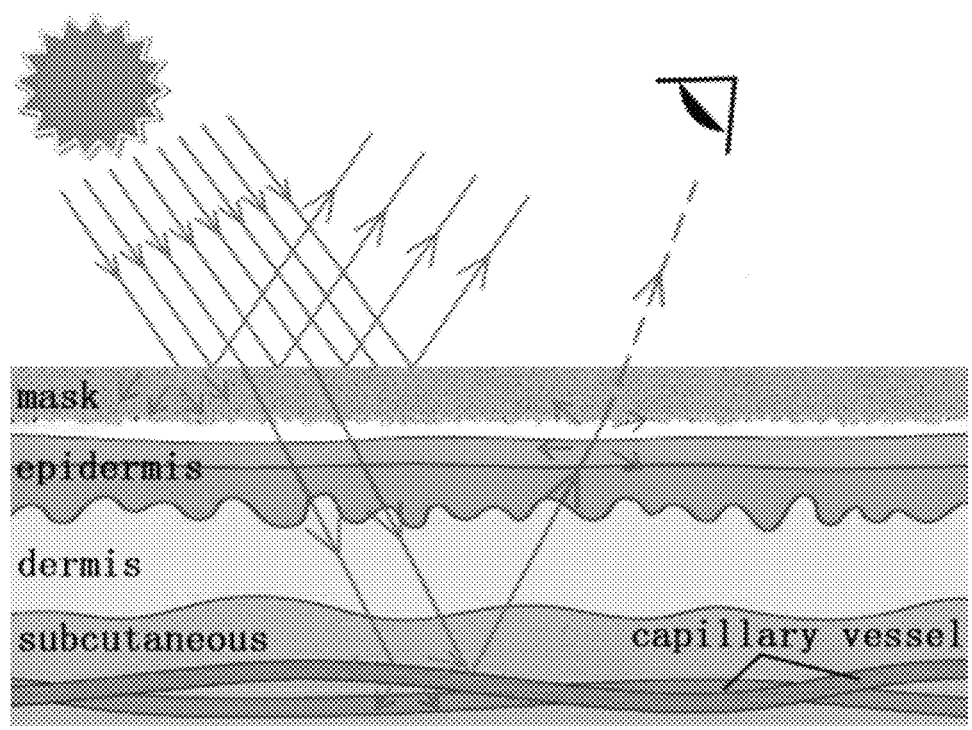
FIG. 1b shows the effect of remote photoplethysmography (rPPG) on a masked face.

For a masked face shown in FIG. 1b, the light needs to go through the mask before interacting with capillaries. Also, source rPPG signal needs to penetrate the mask before captured by camera. So, the observed signal $\hat{s}_m$ can be represented as $$\hat{s}_m = T_m T_s I_m s + \epsilon$$

where $T_m$ is the transmittance of mask and $I_m$ is the mean intensity of face under mask. $I_m$ can be modeled as $I_m = T_m I$. With simple deduction, the observed signal from the masked face can be represented as $$\hat{s}_m = T_m^2 T_s I s + \epsilon \qquad (2)$$
$$= T_m^2 \hat{s}_l + \epsilon$$

Considering the transmittance of existing mask material, the rPPG signal from a masked face is too weak to be detected, which leads to the feasibility of the present method. Hence, rPPG signal can be detected on unmasked face or genuine face, but not masked face.

3.2 Local rPPG for 3D Mask Face Anti-Spoofing

Based on the above analysis, 3D masked faces can be distinguished from real faces by analysing rPPG signals extracted from the global face. Unfortunately, global rPPG signals are too weak to be detected in real application scenario. From Eq. (1), $\hat{s}_l$ is proportional to the intensity I. As shown in FIG. 1a, rPPG signals are weak (around ±2 variations for a 8-bit color camera which indicated in Kumar, M., Veeraraghavan, A., Sabharwal, A.: Distan-cePPG: robust non-contact vital signs monitoring using a camera. Biomed. Opt. Express 6(5), 1565 (2015)) since only a small portion of light can transmit to blood vessels as most of light energy is reflected or absorbed by human skin. Hence, poor video quality such as inadequate exposure will weaken $\hat{s}_l$ and increase the difficulty of detection. Also, rPPG is sensitive to illumination change since it is based on subtle heartbeat-related color variation of the region of interest during a specific time interval. Face motion may also conceal the rPPG signal by introducing imprecise tracking or skin angle change. Meanwhile, when a user is under single light source, head motion may also cause intensity changes on face. This is because facial structure, e.g., hair or nose, casts shadow on skin region and motion changes its area thereby influence the intensity. Therefore, it can be concluded that much interference like video quality, light change or head motion may conceal the subtle heart rate signal. In other words, false rejection error is made since detection of vital sign on genuine face is difficult. Moreover, for partially covered mask, vital signal of a genuine face can still be obtained from the exposed part, such as cheek and forehead, which may contribute heart rate signal and be regarded as liveness evidence which leads to the failure on face anti-spoofing. As such, even if global rPPG signal is detected from a users, such results do not necessarily reflect detection of a genuine face.

The present invention adopts local rPPG signals for 3D mask face anti-spoofing. Existing studies (G. Lempe, S. Zaunseder, T. Wirthgen, S. Zipser, and H. Malberg, "Roi selection for remote photoplethysmography," in Bildverarbeitung für die Medizin 2013. Springer, 2013, pp. 99-103) indicate that strength of rPPG signals vary along local face regions. Flat regions, such as forehead and cheek with dense capillary vessels, can provide rPPG signals with higher signal to noise ratio than other areas. Also, through observation of numbers of users, it was found that local rPPG signal strength forms a stableness pattern among different people. In other words, the local rPPG signals can form a discriminative and robust pattern for 3D mask detection.

4. Present Invention

Based on the above analysis, the present invention provides a novel 3D mask face anti-spoofing method by exploiting the characteristic of local rPPG extracted from 3D mask faces and real faces.

4.1 Overview

Figure 2A:
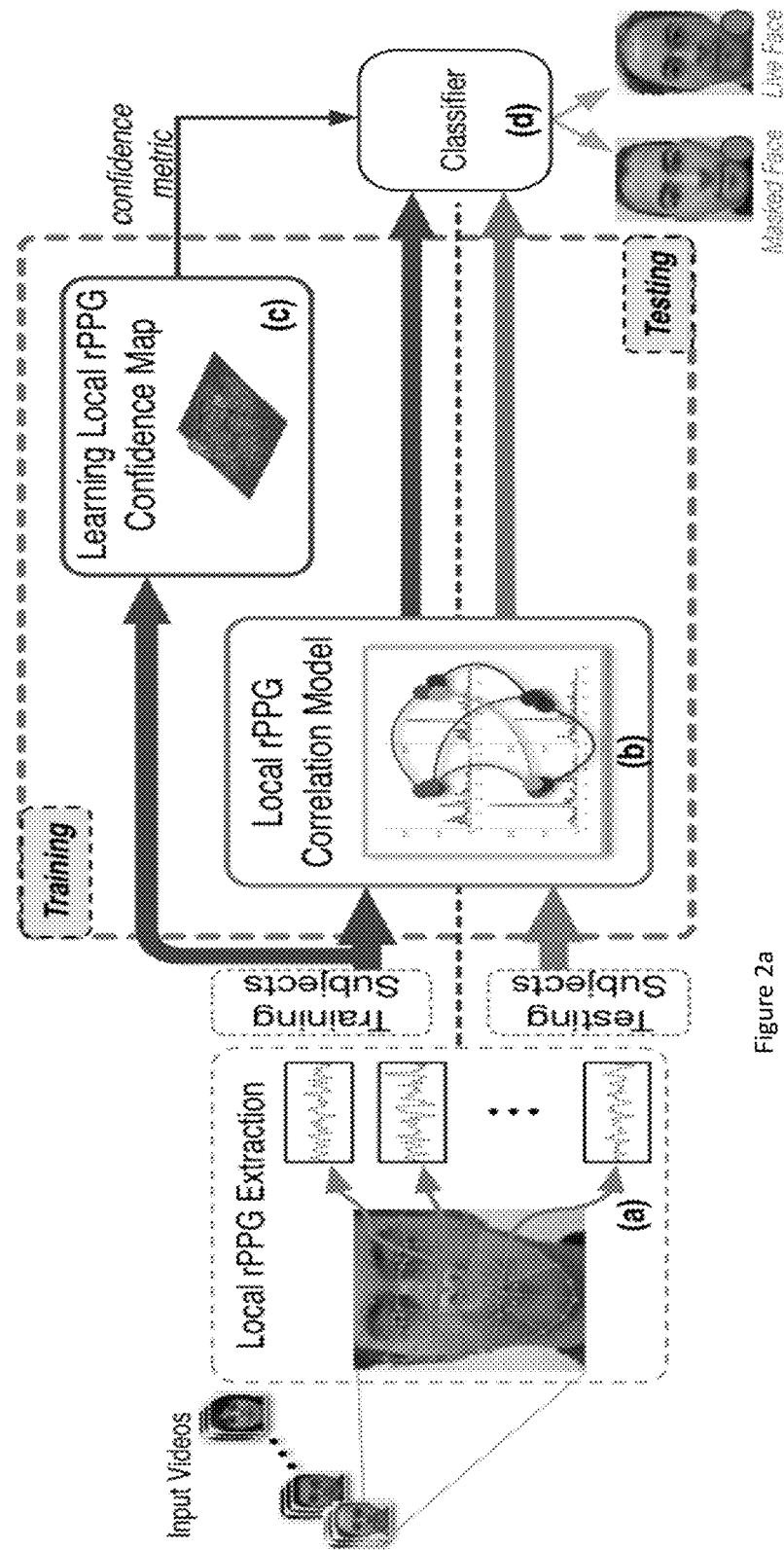
FIG. 2a shows the block diagram of the present face mask anti-spoofing method.
Figure 2B:
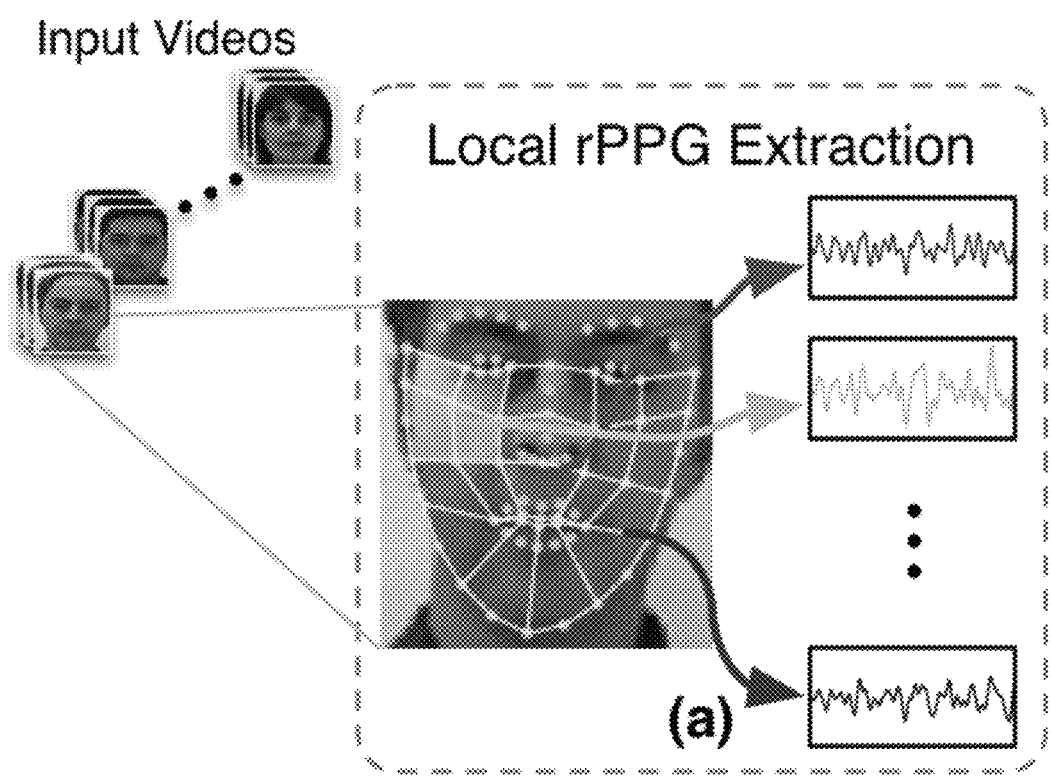
FIG. 2b shows the block diagram of the present face mask anti-spoofing method. The main component is a local rPPG extraction.
Figure 2C:
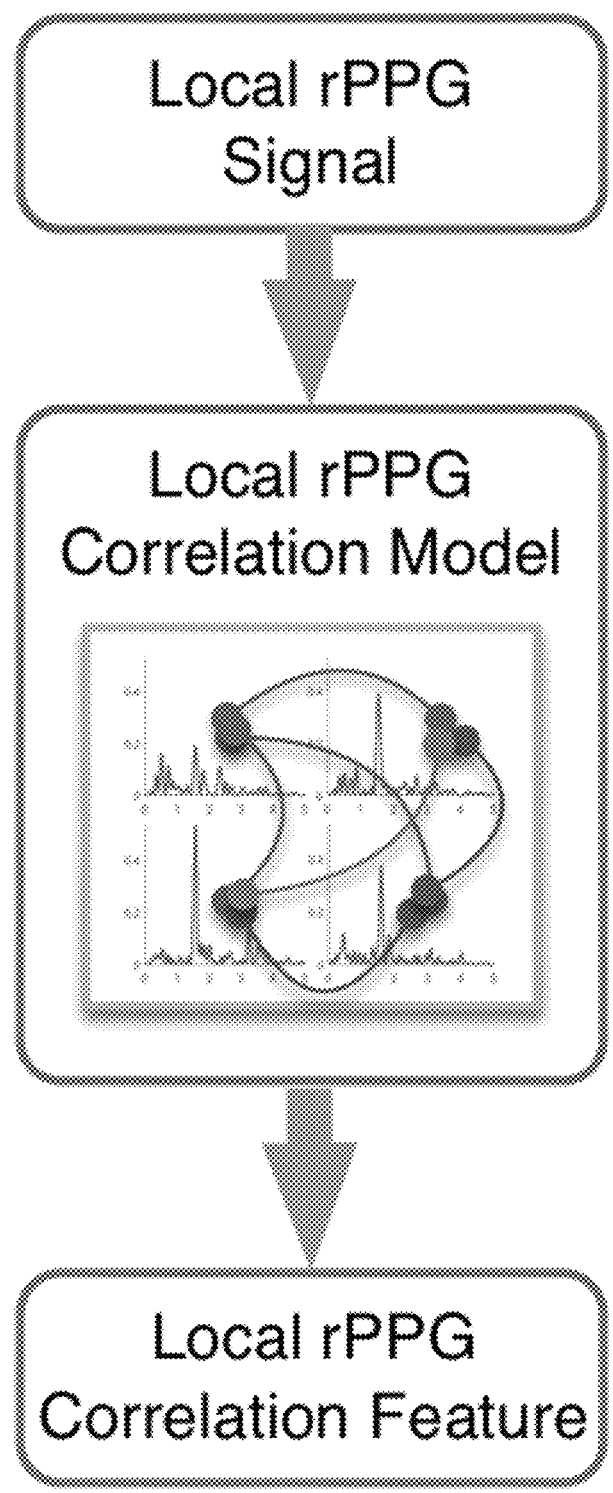
FIG. 2c shows the block diagram of the present face mask anti-spoofing method. The main component is a local rPPG correlation model.
Figure 2D:
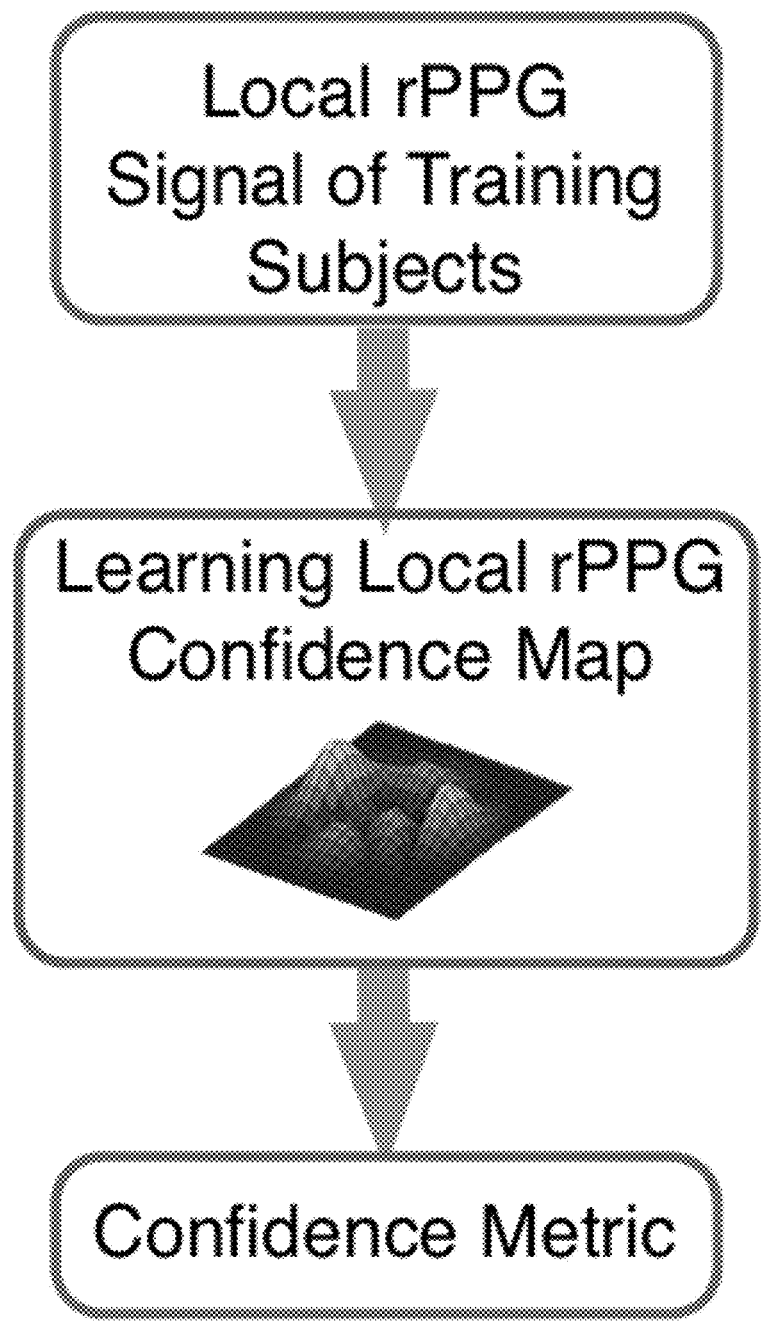
FIG. 2d shows the block diagram of the present face mask anti-spoofing method. The main component is a learning local rPPG confidence map.
Figure 2E:
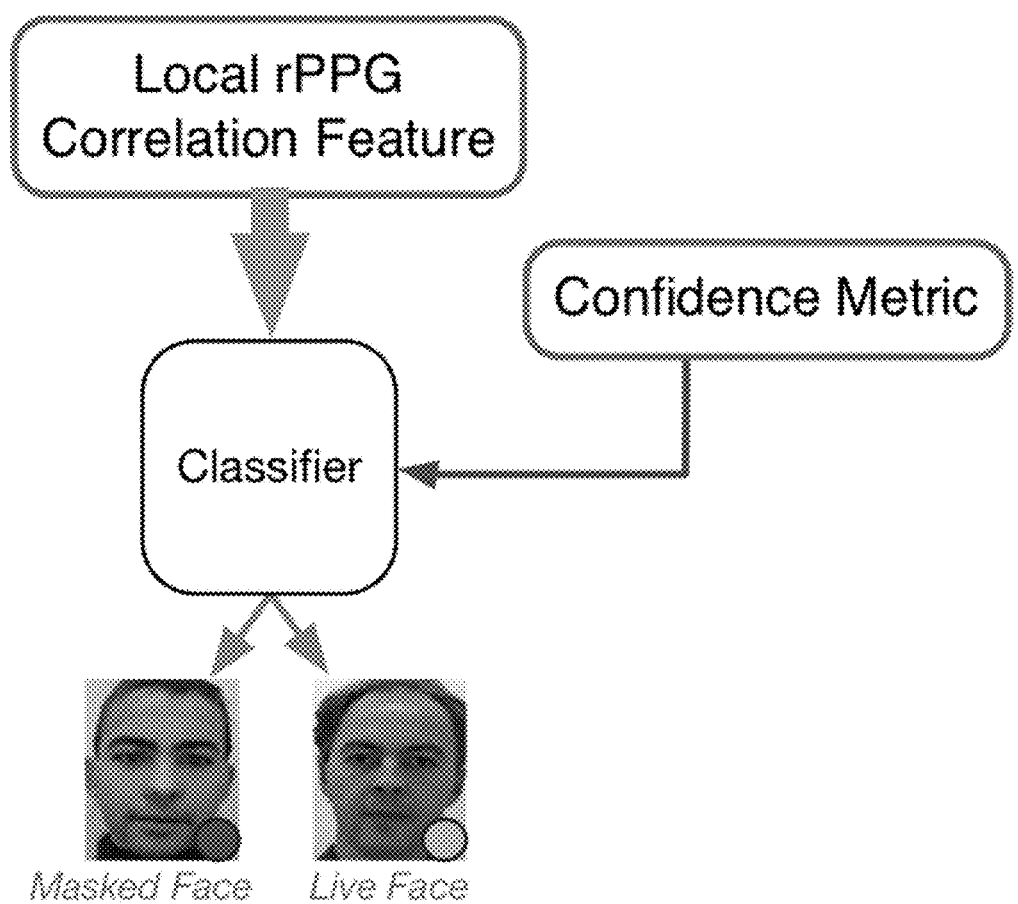
FIG. 2e shows the block diagram of the present face mask anti-spoofing method. The main component is classifier.
Figure 2F:
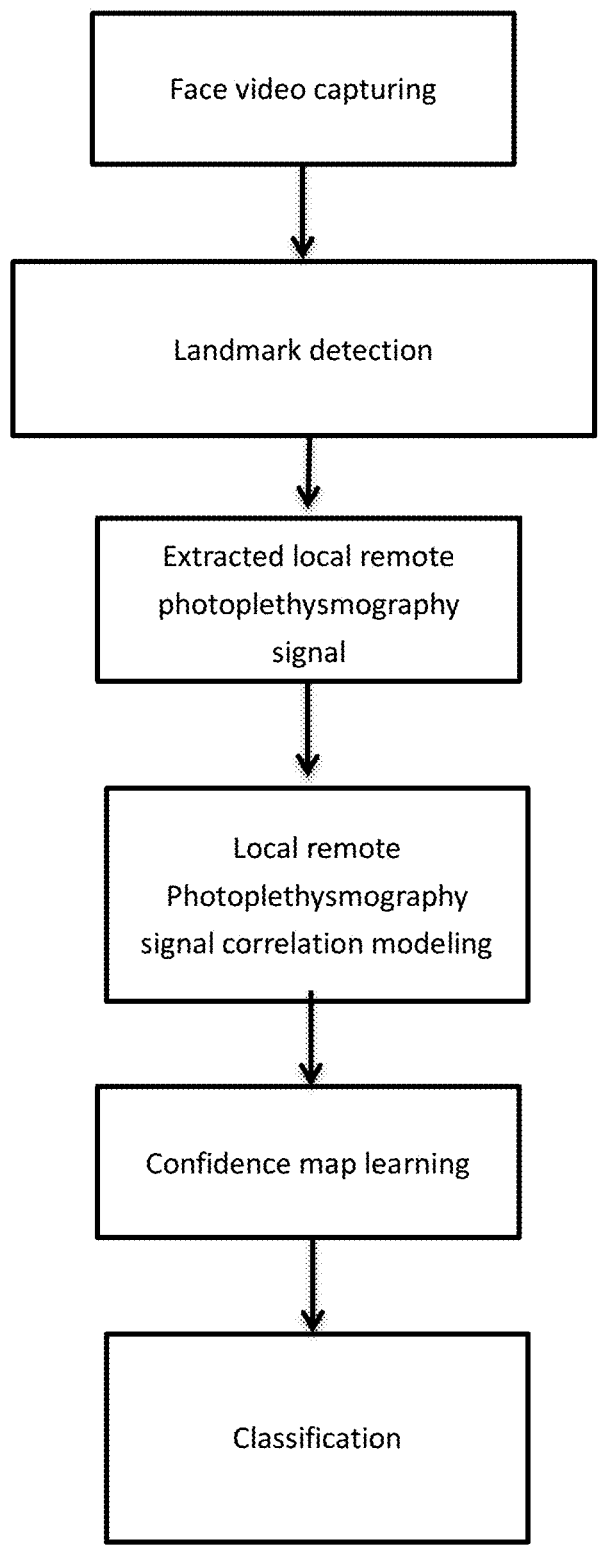
FIG. 2f shows the flowchart of the present face mask anti-spoofing method.

The overview of the present method is presented in FIG. 2a and FIG. 2f, which contains four main components: local rPPG extraction (shown in FIG. 2b), local rPPG correlation modeling (shown in FIG. 2c), confidence map learning (shown in FIG. 2d), and classification (shown in FIG. 2e). From an input video showing a face, local rPPG signals are extracted (FIG. 2b) from the local regions selected from the different face landmarks. Thereafter, the local rPPG correlation model (FIG. 2c) extracts the discriminative local rPPG signal pattern through cross-correlation of the input signals. In the training stage, a local rPPG confidence map is learned (FIG. 2d) and transformed into a metric for measuring the local rPPG correlation pattern. Finally, the local rPPG correlation pattern and the confidence metric are fed into the classifier (FIG. 2e).

First, to avoid imperfect boundary from facial motion, face landmarks are detected by dividing a face into a number of local regions. Then, local rPPG signals are extracted from these local face regions. To make the extracted rPPG signals robust to head motion and noise, the de Haan and Jeanne method (from de Haan, G., Jeanne, V.: Robust pulse rate from chrominance-based rPPG. IEEE Trans. Bio-Med. Eng. 60(10), 2878 (2013)) is adopted as the rPPG sensor on local face regions. In the training stage, the local rPPG signal patterns are extracted through the local rPPG correlation model. At the same time, the present invention uses training users to learn the local rPPG confidence map and transform it into distance metric for classification. In testing stage, when a test face is presented to the system, local rPPG correlation feature representations are also extracted from the testing users. Finally, the result is obtained through the classification.

4.2 Local rPPG Correlation Model

Given the local rPPG signal $[s_1, s_2, \ldots, s_N]'$, local rPPG pattern can be modeled by directly extracting the feature representations of signal, such as the signal-to-noise ratio (SNR), maximum amplitude, or power spectrum density (PSD). Then, the final decision is made by feeding the extracted feature representations into a classifier. However, this intuitive model cannot generalize well because of the following reasons: (1) the rPPG amplitude varies in different region with different people. The intuitive solution may not be able to adapt the signal amplitude variation along different users. (2) rPPG strength varies along video quality under cross-dataset scenario. It means the classifier may over-fit on high quality video containing clear rPPG signal. When encountering genuine testing samples from unseen low quality video, the vital sign may not be the same and instead the classifier may regard it as a mask.

Figure 7A:
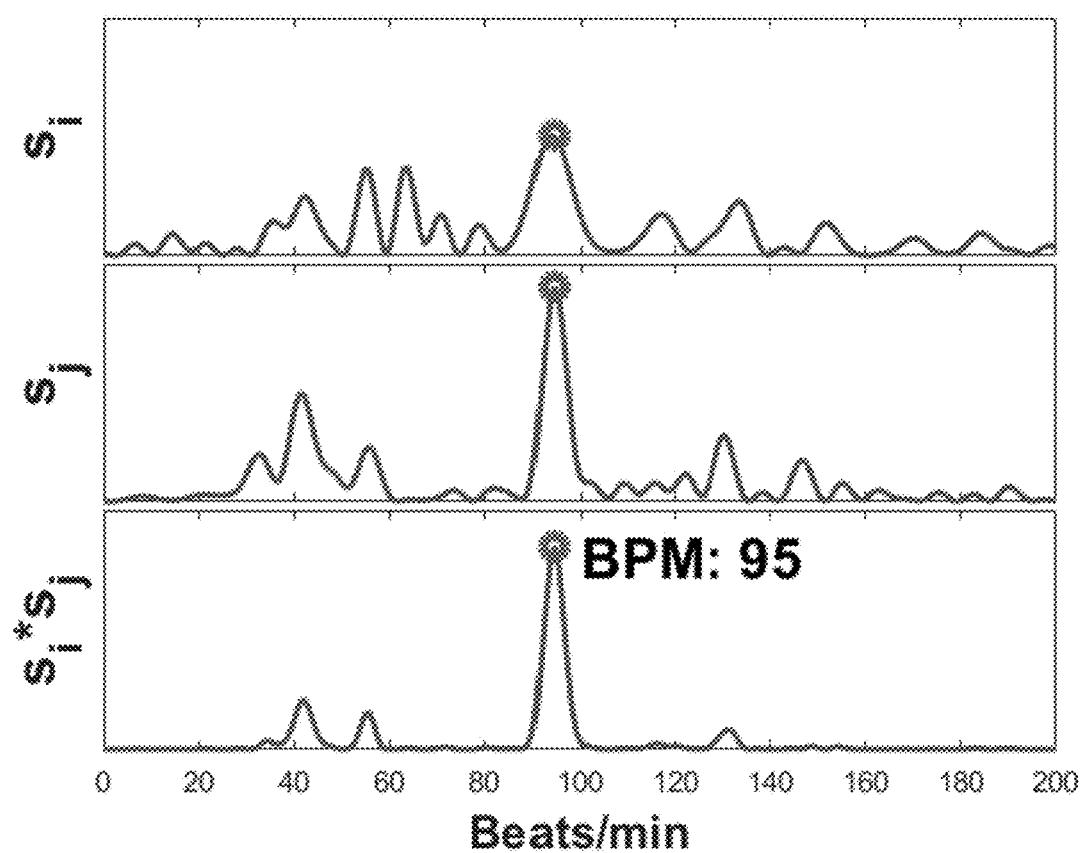
FIG. 7a shows the typical situations of cross-correlation of two rPPG signals with high signal to noise ratio (in this case, higher than 2 dB), $s_i$ and $s_j$, on a live face. The first and second rows are rPPG signal spectrums $s_i$ and $s_j$, respectively. The third row is the cross-correlation spectrum of $s_i$ and $s_j$. The heartrate is showed by the peak with circle mark and the remaining power spectrum density curve represents the noise.
Figure 7B:
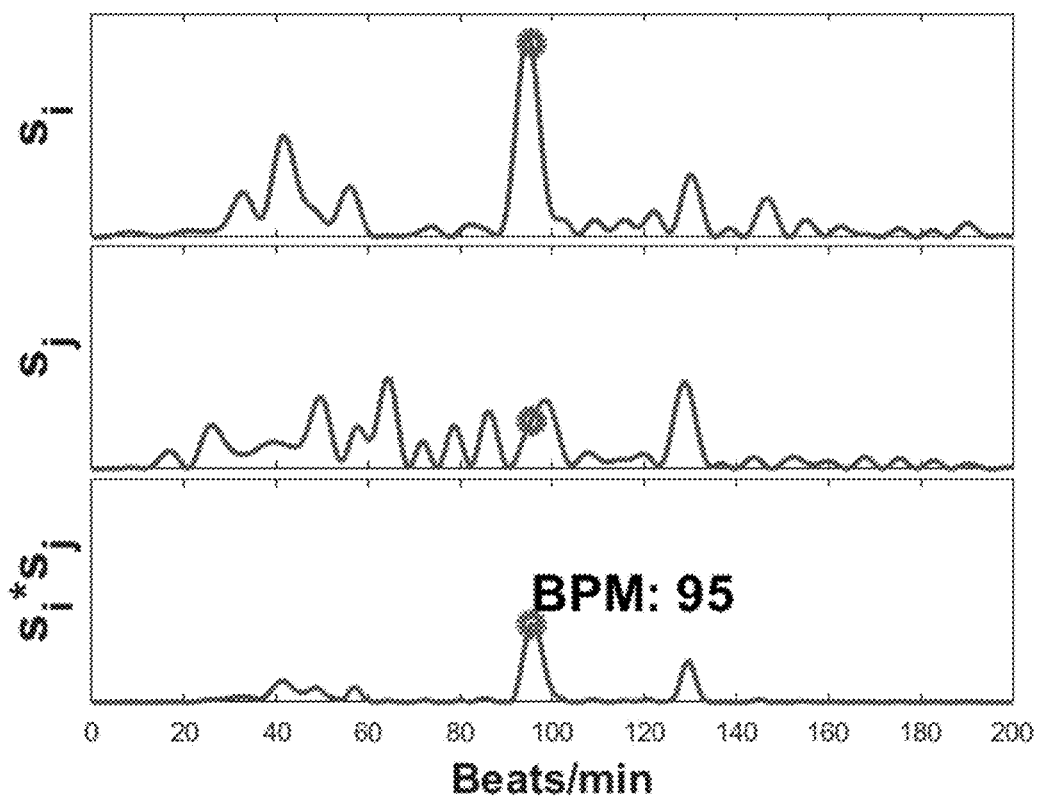
FIG. 7b shows the typical situations of cross-correlation of one rPPG signal with high signal to noise ratio (higher than 2 dB), $s_i$, and one rPPG signal with low signal to noise ratio (lower than 0 dB), $s_j$, on a live face. The first and second rows are rPPG signal spectrums $s_i$ and $s_j$, respectively. The third row is the cross-correlation spectrum of $s_i$ and $s_j$. The heartrate is showed by the peak with circle mark and the remaining power spectrum density curve represents the noise.
Figure 7C:
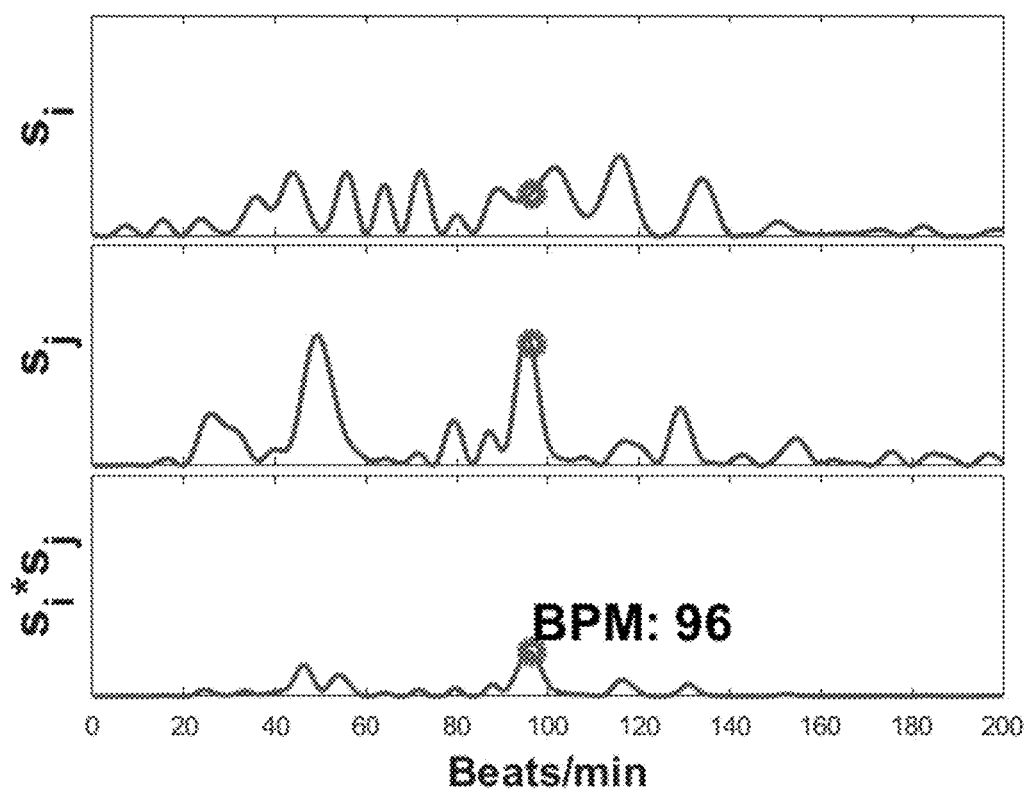
FIG. 7c shows the typical situations of cross-correlation of two rPPG signals with low signal to noise ratio (lower than 0 dB), $s_i$ and $s_j$, on a live face. The first and second rows are rPPG signal spectrums $s_i$ and $s_j$, respectively. The third row is the cross-correlation spectrum of $s_i$ and $s_j$. The heartrate is showed by the peak with circle mark and the remaining power spectrum density curve represents the noise.
Figure 7D:
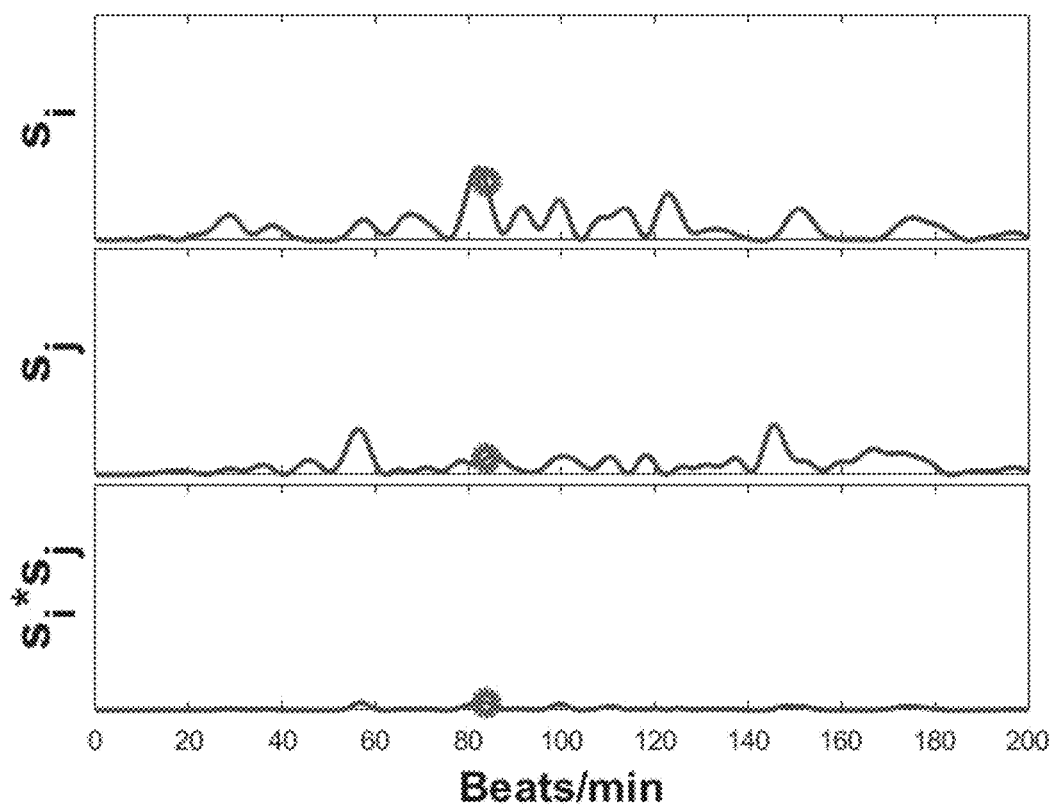
FIG. 7d shows the typical situations of cross-correlation of two extracted rPPG signals, $s_i$ and $s_j$, on a masked face. The first and second rows are rPPG signal spectrums $s_i$ and $s_j$, respectively. The third row is the cross-correlation spectrum of $s_i$ and $s_j$.

The rPPG principle is measuring human pulse rate through the blood flow variation caused by heartbeat. It indicates that, for a sample user, rPPG signals from different local regions should have similar shape. It implies that, local rPPG signals should have great consistency on genuine face. On the other hand, for a masked face, the frequency similarity and periodicity are small, since the vital signals are blocked and the remaining signal mainly contains environmental noise. Therefore, the present invention models the local rPPG pattern through the union of similarity of all the possible combination as follow:

$$x = U_{i,j=1,\ldots N, i \neq j} \rho(s_i, s_j) \quad (3)$$

where $\rho(s_i, s_j)$ measures the similarity between two signals si and sj, and the union U is the concatenation operator. To measure the similarity between two signals with periodic frequencies, the similarity $\rho(s_i, s_j)$ is defined as the maximum value of the cross-correlation spectrum of two local rPPG signals $$\rho(s_i, s_j) = \max |\mathcal{F}\{s_i \star s_j\}| \quad (4)$$

where $\mathcal{F}$ is the Fourier transform and $\star$ is the cross-correlation operator. By conducting the cross-correlation, the shared periodicity is filtered out and the random environmental noises are eliminated with each other. For two local rPPG signal with higher signal to noise ratio (in this case, higher than 2 dB), the effect of cross-correlation is show in FIG. 7a. For cross-correlation of one local rPPG signal with higher signal to noise ration (in this case, higher than 2 dB) and one local rPPG signal with lower signal to noise ration (in this case, lower than 0 dB), the shared peak can also be extracted as shown in FIG. 7b. Even for the worst case with two local rPPG signals with lower signal to noise ration (in this case, lower than 0 dB), the heartbeat peak is also filtered out as shown in FIG. 7c. Note that the signal to noise ratio in this case is the ratio of heartrate peak (circle mark in FIG. 7) over summation of other values in the power spectrum density curve (Please refer Eq. (6) for details). For the signals extracted on masked face, the cross-correlation will weaken the noise as shown in FIG. 7d. The resulting local rPPG correlation pattern is a C(N, 2)+N dimensional feature.

Note that the signal s is not a feature vector. Euclidean distance cannot be used to measure the similarity $\rho$ between $s_i$ and $s_j$. Thus, the present invention is designed to simultaneously determine the periodicity of the signal and measure its frequency similarity. By doing the cross-correlation operation in Eq. (4), the shared heartbeat related frequency is filtered out and the random noise is reduced. Signals extracted from local masked face regions suppress each other because they are random noise and do not share the same periodic frequency. Therefore, 3D mask can be effectively detected since the local rPPG correlation pattern x shows a even distribution on liveness face but not for masked face.

4.3 Learning Local rPPG Confidence Map

Given the local rPPG signal $[s_1, s_2, \ldots, s_N]'$, the local rPPG correlation pattern can be discriminative under well controlled conditions. However, when encountering poor video quality, e.g., low exposure rate, the performance may drop since rPPG signals may be too weak and concealed by noise. In Section 3, the rPPG signal strength varies along local face region with a even spatial distribution. It is possible to boost the discriminative ability of x by emphasizing the robust regions with strong rPPG signal (e.g. 2 dB or more in certain exemplary embodiments) and deemphsizing the unreliable regions which contain weak rPPG signals (e.g. 0 dB or less in certain exemplary embodiments). To this end, the present method includes learning the confidence map of local rPPG signals through the signal quality from training users. Specifically, in the training stage, the inventors use subjects' local rPPG signals to learn the confidence map which reflect the reliability of each local facial region. The confidence map is a vector that each dimension is between [0,1]. The larger the value, the more confidence the region is. Details are explained as follows.

Given J training users, considering a learning function y, which maps the signal quality to a real value, such that the average quality is maximized, i.e., $$\operatorname{argmax} \Sigma_{j=1}^{J} y(g(s^j, e^j)) \quad (5)$$

where $g(s^j, e^j)$ measures the signal quality of $s^j$ given its "ground truth" heart rate signal $e^j$. As analysed in Kumar, M., Veeraraghavan, A., Sabharwal, A.: DistancePPG: robust non-contact vital signs monitoring using a camera. Biomed. Opt. Express 6(5), 1565 (2015), the quality measure g can be defined by $$g(s^j, e^j) = \frac{\Sigma_{f_{HR}-r}^{f_{HR}+r} \hat{s}^j(f)}{\Sigma \hat{s}^j(f) - \Sigma_{f_{HR}-r}^{f_{HR}+r} \hat{s}^j(f)} \quad (6)$$

Here, $|\mathcal{F}\{s^j\}|$, the module of the Fourier transform of $s^j$, as $\hat{s}^j$. $f_{HR}$ is the spectrum peak frequency which represents the user's heart rate defined in Eq. (7). r is the error toleration.

$$f_{HR} = \operatorname{argmax} \mathcal{F}\{e^j\} \quad (7)$$

To simplify the problem, y is a linear function, i.e., $y(g(.,.))=\langle p,g(.,.)\rangle$. Parameter $p=[p_1, \ldots, p_N]$ could be regarded as the confidence vector which represents the patterns of signal strengths corresponding to N local face regions. Hence, the optimization problem can be written as follow $$\operatorname{argmax}_p \Sigma_{j=1}^J \langle p, g(s^j, e^j)\rangle \quad (8)$$

To normalize the confidence $p=[p_1, \ldots, p_N]$ across all local face regions, a constraint is added to ensure that $\|p\| \le 1$.

In order to solve Eq. (8), the "ground truth" $e^j$ for the measurement of $g(s^j, e^j)$ is needed. $e^j$ is approximated through PCA decomposition given signal $S=[s_1, s_2, \ldots s_N]$ ($s_i$ is centralized) and the corresponding confidence p. Thus, the covariance matrix can be written as $\Sigma=S'PS$, where $P=\operatorname{diag}(p_i^2)$. By applying standard PCA to $\Sigma$, $E=[e_1, \ldots, e_N]$ is reconstructed by $E=S\Phi\Phi'$ where $\Phi$ is the eigenvectors correspond to the largest k eigenvalues that preserve a percent of the variance. Note that since S is constrained between a reasonable HR range in the rPPG extraction stage, e will also share the same property. Finally, e is approximated by $$e = \frac{1}{N}\sum_{i=1}^{N} e_i \quad (9)$$

Considering the estimation of $e^j$ involves the inter-dependence between confidence p and signals S, it may not be suitable to solve the objective function directly, with linear programming. Therefore, an iterative approach is applied in the present invention, as summarized in Algorithm 1, to solve it by alternatively updating p and e. At iteration t, $e^j(t)$ is first updated with the confidence $p(t-1)$, and then update confidence $p(t)$ with the updated "ground truth" of $e^j(t)$. When the convergence threshold $\delta$ is reached, the output confidence map p is obtained.

Given the local rPPG confidence map p, the confidence of x is measured by computing each dimension's reliability. Following Eq. (3), the confidence of x is computed as ---
Algorithm 1. Local rPPG confidence learning
---

Input: Training signals $S = [S^1,\ldots,S^J]$ converge threshold $\delta$
Output: local rPPG confidence p
$t = 1$, $p(0) = \sqrt{N} / N$ ;
repeat
  for j = 1 to J
  do
    given $p(t-1)$, apply PCA to $\Sigma = S^j PS^j$ where
    $P = \operatorname{diag}(p_i^2(t-1))$;
    reconstruct $[e_1^j,\ldots,e_N^j] = S^j\Phi\Phi$ ;
    update $e^j(t)$ by computing Eq. 9;
  update p(t) by solving Eq. 8 given $[e^1(t),\ldots,e^J(t)]$;
until $|p(t) - p(t-1)| \le \delta$;
return p(t);

$$q =_{i,j=1,\ldots,N \atop i \ne j} p(s_i, s_j) \quad (10)$$

Figure 6:
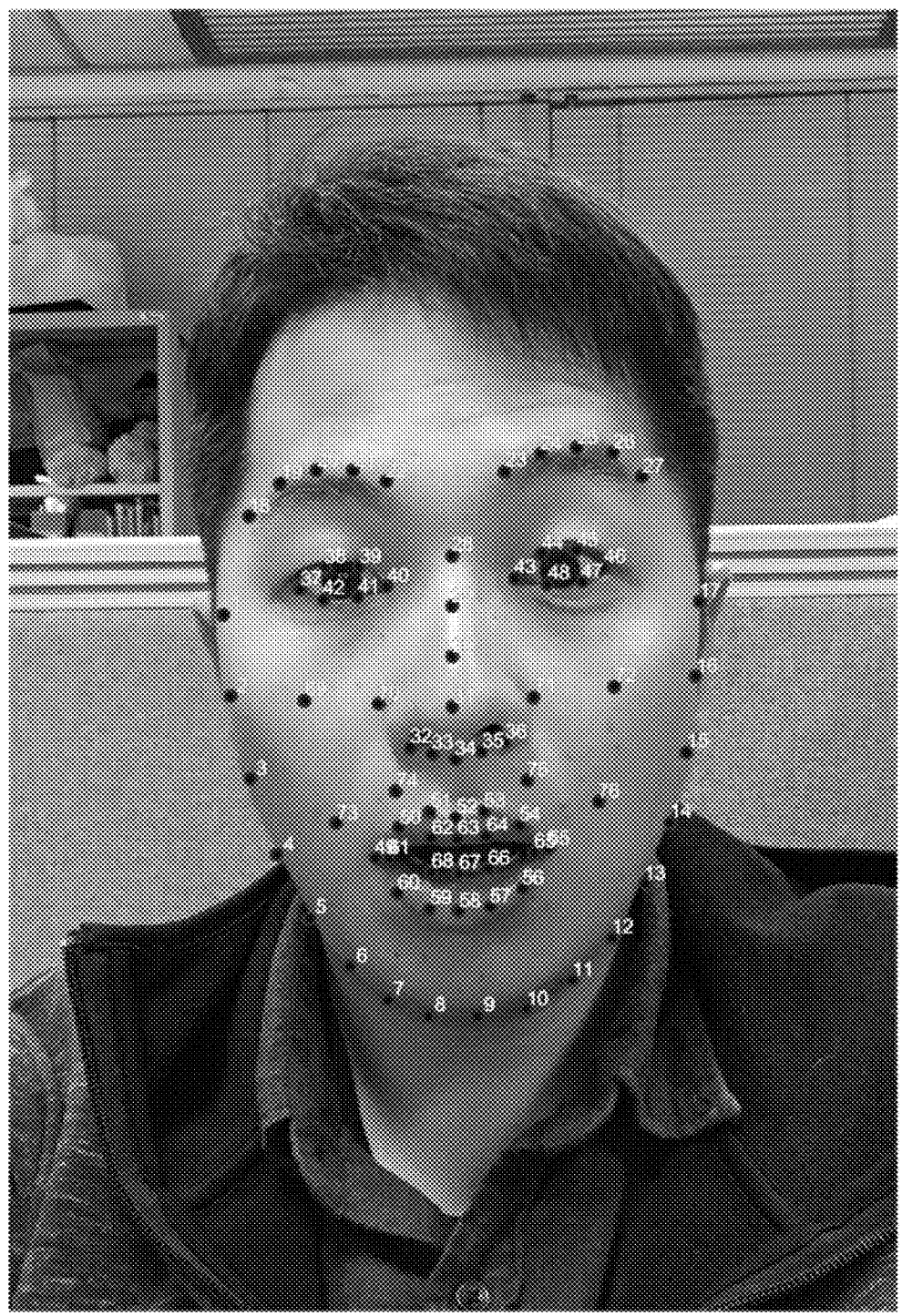
FIG. 6 shows the landmark index used to define the unit local region of interest (ROI).

Here, the confidence of local regions is assumed to be independent from each other, so, $p(s_i, s_j) = p_i p_j$.
Finally, SUPPORT VECTOR MACHINE (Dustin Boswell, Aug. 6, 2002) is used with RADIAL-BASIS-FUNCTION kernel for classification. In order to weaken the interference of corrupted local rPPG, the joint confidence q is employed to adjust the distance metric in RADIAL-BASIS-FUNCTION kernel as $RBF_q(x_i,x_j)=e^{-\gamma D_q(x_i,x_j)^2}$ where $D_q(x_i,x_j)=\sqrt{(x_i-x_j)^T Q(x_i-x_j)}$ and $Q=\operatorname{diag}(q_i)$ 5 Experiments 5.1 Implementation Details CSIRO face analysis SDK, 29. Cox, M., Nuevo-Chiquero, J., Saragih, J., Lucey, S.: CSIRO face analysis SDK, Brisbane, Australia (2013), is employed to detect and track 66 facial landmarks. In order to divide the face into local REGION OF INTERESTs, 4 additional interest points are generated from the mid-point of landmarks (2, 33), (14 33), (1, 30) and (15, 30). As shown in FIG. 6, 22 units REGION OF INTERESTs (FIG. 6) are evenly defined as boxes. The 22 unit local ROI is defined based on the landmark index in FIG. 6 as follow: (1 37 69 2); (37 42 41 40 70 69); (40 28 31 70); (28 43 71 31); (43 48 47 46 72 71); (46 17 16 72); (2 69 73 4 3); (69 70 74 73); (70 30 34 74); (30 71 75 34); (71 72 76 75); (72 16 15 14 76); (4 73 49 5); (73 74 62 49); (74 34 63 62); (34 75 64 66); (75 76 55 64); (76 14 13 55); (5 49 68 7 6); (68 67 58 9 8 7); (67 66 11 10 9 58); (66 55 13 12 11). Finally, every 4 unit neighbor (FIG. 6) REGION OF INTERESTs are combined to form 15 overlapped local REGION OF INTERESTs. As such, local region of interests are defined along the index of the 22 local unit regions. The details are listed as follows, (1 2 7 8); (2 3 8 9); (3 4 9 10); (4 5 10 11); (5 6 11 12); (7 8 13 14); (8 9 14 15); (9 10 15 16); (10 11 16 17); (11 12 17 18); (13 14 19); (14 15 19 20); (15 16 20 21); (16 17 21 22); (17 18 20).

For rPPG extraction, the cutoff frequency is set as 40-180 beats/min through a bandpass filter. For local rPPG correlation model, all the possible 120 combinations are generated and normalized from the 15 local rPPG signals and normalized. For local rPPG confidence map, the error toleration is set to r=3 beats/min, convergence threshold $\delta=10^{-3}$. In the estimation of e, $\alpha=60\%$. Normally, eigenvectors that correspond to the largest 3 eigenvalues are selected.

5.2 Datasets

3D Mask Attack Database.

3D Mask Attack Database (3DMAD) is a public mask attack dataset built with the 3D masks from Thatsmyface.com. It contains 17 users, 3 sessions and total 255 videos (76500 frames). Each user corresponds to 15 videos with 10 live faces and 5 masked faces. Videos are recorded through Kinect and contain color and depth information in 640*480 resolutions. In these experiments, only the color information is used for comparison.

Supplementary Dataset.

Figure 3A:
FIG. 3a shows the sample frames from supplementary dataset is a genuine face.
Figure 3B:
FIG. 3b shows the sample frames from supplementary dataset is a mask from Thatsmyface.com.
Figure 3C:
FIG. 3c shows the sample frames from supplementary dataset is a hyper-real mask from REAL-f.

3D Mask Attack Database is a well-organized dataset that contains large amount of videos from numerous of masks. But there are still some limitations: (1) Diversity of mask type is small. It only contains the masks from Thatsmyface.com. (2) All videos are recorded under the same camera setting through Kinect (a device that can capture both the RGB and depth information). To overcome these limitations, a supplementary (hereinafter referred to as 'SUPPLEMENTARY') dataset is created to enlarge the diversity of mask types and camera settings. The SUPPLEMENTARY dataset contains 120 videos (36000 frames) recorded from 8 users. It includes 2 types of 3D masks: 6 from Thatsmyface.com and 2 from REAL-f. Each user has 10 genuine samples and 5 masked samples, as the format adopted in 3DMAD. All videos are recorded through Logeitech C920 web-camera in the resolution of 1280*720. Each video contains 300 frames and the frame rate is 25 fps. Image samples of the genuine video and 2 types of videos of masked face are shown in FIG. 3a-3c. Specifically, FIG. 3a shows the genuine face. FIGS. 3b and 3c shows the masked face from Thatsmyface.com and Real-f, respectively.

By merging the Supplementary dataset with the 3D Mask Attack Database, the Combined (hereinafter referred to as 'COMBINE') dataset contains 25 users, 2 types of masks, and 2 camera settings, which has larger diversity that is close to the application scenario. Experiments are carried out on the COMBINE dataset and the SUPPLEMENTARY dataset.

5.3 Testing Protocols and Baseline Methods

Testing Protocol.

The effectiveness, and robustness of the present method are evaluated under three protocols: (1) intra-dataset testing protocol, (2) cross dataset testing protocol, (3) robustness evaluation.

For intra-dataset testing protocol, leave-one-out cross validation (LOOCV) used in Erdogmus, N., Marcel, S.: Spoofing face recognition with 3D masks. IEEE Trans. Inf. Forensics Secur. 9(7), 1084-1097 (2014) is adopted. In the current embodiment of the present invention, users in training set and development set are randomly selected to avoid the possible effect of user sequence. In LOOCV protocol, data is divided in to 3 sets, for training, development, and testing. The training data is used to train the face anti-spoofing model. The development set is used to tune the parameter of the trained model and the testing is used for evaluation of the model. Note that the data are derived in the unit of user and each one contains the 2 sessions of video of a genuine face and 1 session of video of a masked face. For the Combined dataset of the 3DMAD and supplementary dataset (SUP), 8 users were chosen for training and 16 users for development. For the SUPPLEMENTARY dataset, the inventors randomly chose 3 users as training set and 4 users as development set. To evaluate the influence of high quality masks from REAL-f (FIG. 3c), the inventors test the performance by including and excluding the REAL-f masks in both Combined dataset and SUP dataset.

For the cross-dataset protocol, 3D Mask Attack Database dataset and SUPPLEMENTARY dataset are involved. For the setting of training on 3D Mask Attack Database and testing on SUPPLEMENTARY (hereinafter referred to as '3D Mask Attack Database to SUPPLEMENTARY'), 8 users' videos were randomly selected from 3D Mask Attack Database as training set and use all users from SUPPLEMENTARY for testing. For training on SUPPLEMENTARY, testing on 3D Mask Attack Database (hereinafter referred to as 'SUPPLEMENTARY to 3D Mask Attack Database'), 5 users are randomly selected from SUPPLEMENTARY as training set and use all in 3D Mask Attack Database for testing.

In order to evaluate the robustness of the present method, the present method is tested under intra and cross testing protocols with different training scales. To avoid the resemblance effect of live faces and masks, the training data scale is set along user units. For intra-dataset experiments on COMBINE dataset and SUPPLEMENTARY dataset, the training scales are set to 1 to 8 and 1 to 5, respectively. For the cross-dataset experiments of 3D Mask Attack Database to SUPPLEMENTARY and SUPPLEMENTARY to 3D Mask Attack Database, the training scales are set to 1 to 17 and 1 to 8, respectively.

False Fake Rate (FFR), False Liveness Rate (FLR), Half Total Error Rate (HTER), ROC (Receiving Operating Characteristic), AUC (Area Under Curve), and EER (Equal Error Rate) are employed for evaluation. For intra-dataset test, HTER is evaluated on testing set (HTER dev) and training set (HTER test). All the criterions are ratio in percentage. As the HTER and EER are related to the error rate, the smaller the value means a better result of the method. For AUC, the higher the value means the better the method is.

Baseline Method.

the Multi-Scale LOCAL BINARY PATTERN, which achieves the best performance on 3D Mask Attack Database 2D images, is selected as the baseline. For a normalized face image, $LBP_{16,2}^{u2}$, $LBP_{8,2}^{u2}$ from the entire image and $LBP_{8,1}^{u2}$ from the 3×3 overlapping regions are extracted. Therefore, one 59-bins, one 243-bins and nine 53-bins histograms feature are generated. Finally, histograms are concatenated as the final 833-dimensional feature representation.

5.4 Experimental Results

Figure 4A:
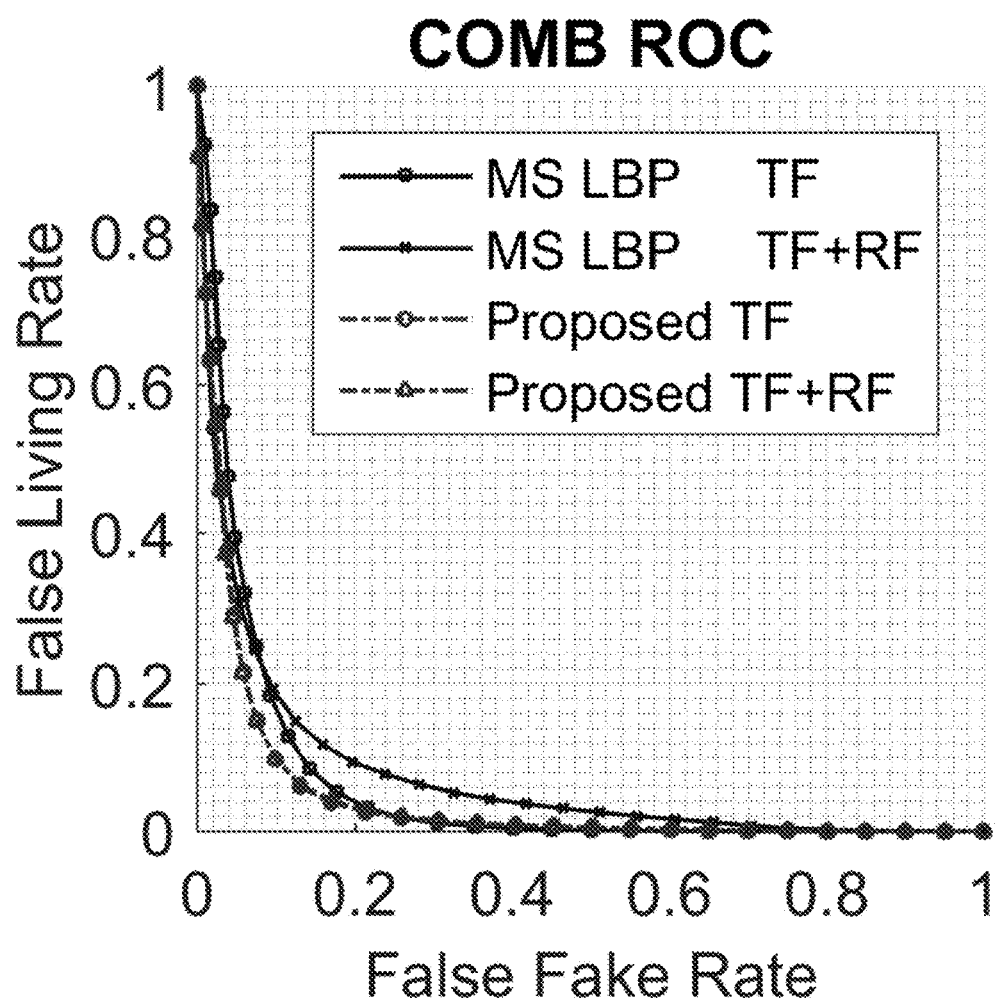
FIG. 4a shows the Receiver Operating Characteristics (ROC) curves under intra-database and cross-database protocol: COMBINE (COMB) dataset. Note that the legend TF and RF means Thatsmyface.com mask and REAL-f mask; MS LBP is multi-scale local binary patterns; Proposed is the present invention.
Figure 4B:
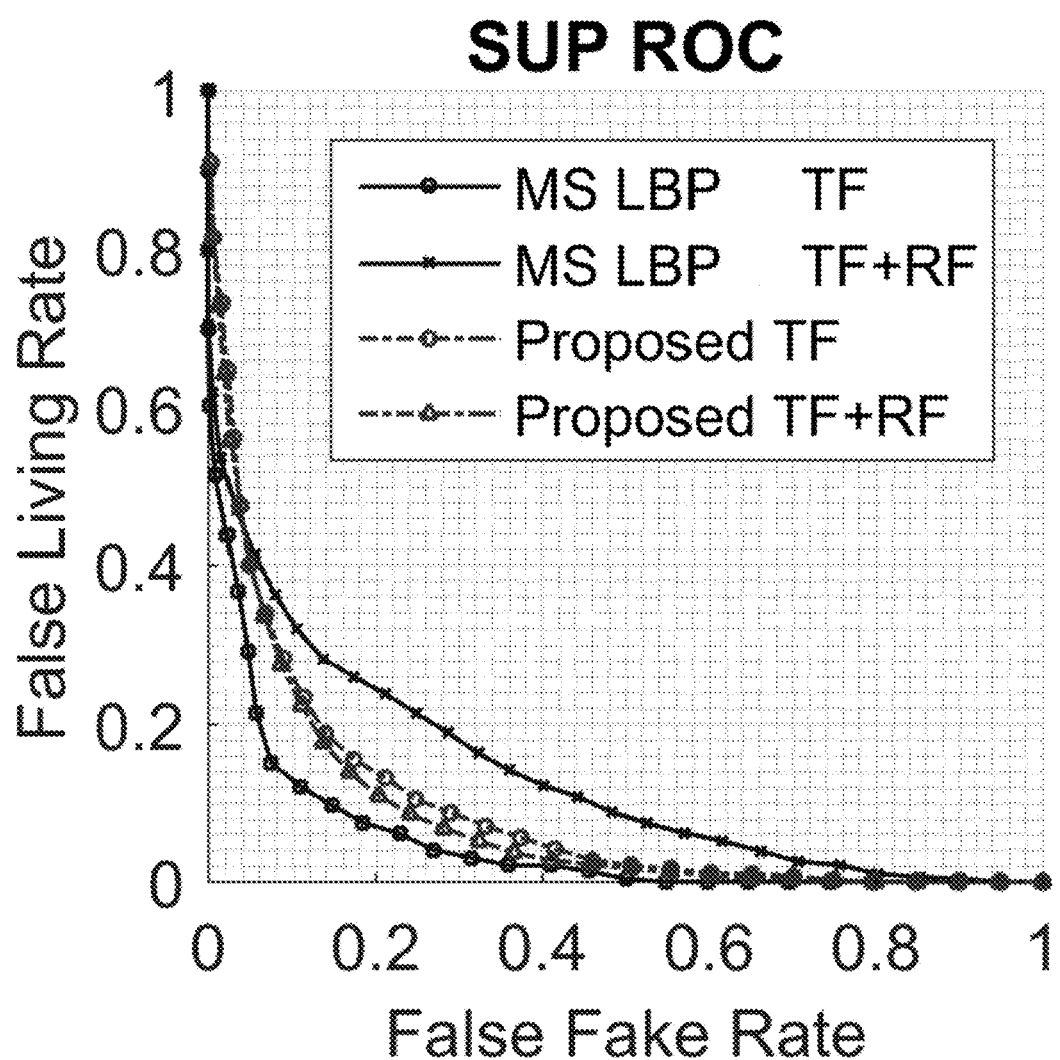
FIG. 4b shows the ROC curves under intra-database and cross-database protocol: SUPPLEMENTARY (SUP) dataset. Note that the legend TF and RF means Thatsmyface.com mask and REAL-f mask.

Intra-dataset results are given in Table 1, FIGS. 4a and 4b. For HTER_dev, HTER_test, EER, the lower the value the better. For AUC, the higher the value the better. FIGS. 4a, 4b and Table 1 shows the present method results in more accurate anti-spoofing method as compared to existing method. FIGS. 4a and 4b show the ROC curves of the present method (proposed method) and baseline method. Y axis is the false living rate which means the ratio of the masks that are wrongly detected as genuine faces. X axis is the false fake rate which means the ratio of the genuine faces that are wrongly detected as masks. The closer of the ROC curve to the origin (left corner), which means false living rate and false fake rate reach to 0 at the same time. Left shift of ROC curve indicates a better of method. Achieved were lower HTER EER and higher AUC (the second line in Table 1) on the Combined dataset as well as the Supplementary dataset as it is the closest curve to the origin (left corner), which justifies the effectiveness of the present method. Meanwhile, from FIGS. 4a and 4b, the present method achieves close results with or without the hyper-real masks from REAL-f. This justifies the analysis in Section 3 that the rPPG-based solution is independent to the mask's appearance quality. Note that the MS-LOCAL BINARY PATTERN drops (e.g., 8.4% AUC on SUPPLEMENTARY and 1.3% AUC on COMBINE) when including the hyper-real REAL-f masks in both datasets. Although the MS-LOCAL BINARY PATTERN achieves the best performance on Supplementary dataset when only Thatsmyface masks are used, its performance is poor when using all masks justifies its weak generalization ability.

This may justify the analysis that the texture-based method may not be discriminative on masks with good appearance quality. As shown in FIG. 3c, REAL-f masks have highly realistic appearance. The face structures of REAL-f are precisely corresponded. Skin texture is highly restored including the wrinkles, freckles and visible capillary vessels. Interestingly, comparing with 3D Mask Attack Database, the present method shows lower performance on high resolution dataset: SUPPLEMENTARY. It was hypothesized that this is due to the camera setting. In fact, SUPPLEMENTARY is recorded with dark background. In order to achieve appropriate global exposure, the camera automatically adjusts the gain setting, and the actual exposure rate is not sufficient to extract clear rPPG signal.

TABLE 1

Experiment results on COMBINE and SUPPLEMENTARY under intra-dataset test protocol. Combined dataset Supplementary dataset.

| | Combined dataset | | | | Supplementary dataset | | | |
|---|---|---|---|---|---|---|---|---|
| | HTER dev (%) | HTER test (%) | EER (%) | AUC (%) | HTER dev (%) | HTER test (%) | EER (%) | AUC (%) |
| MS-LOCAL BINARY PATTERN (MS LBP, Existing method) | 13.1 ± 6.3 | 13.8 ± 19.4 | 13.6 | 92.8 | 19.5 ± 11.1 | 23.0 ± 21.2 | 22.6 | 86.8 |
| Present Invention (Proposed) | 9.2 ± 2.0 | 9.7 ± 12.6 | 9.9 | 95.5 | 13.5 ± 4.7 | 14.7 ± 10.9 | 16.2 | 91.7 |

Figure 4C:
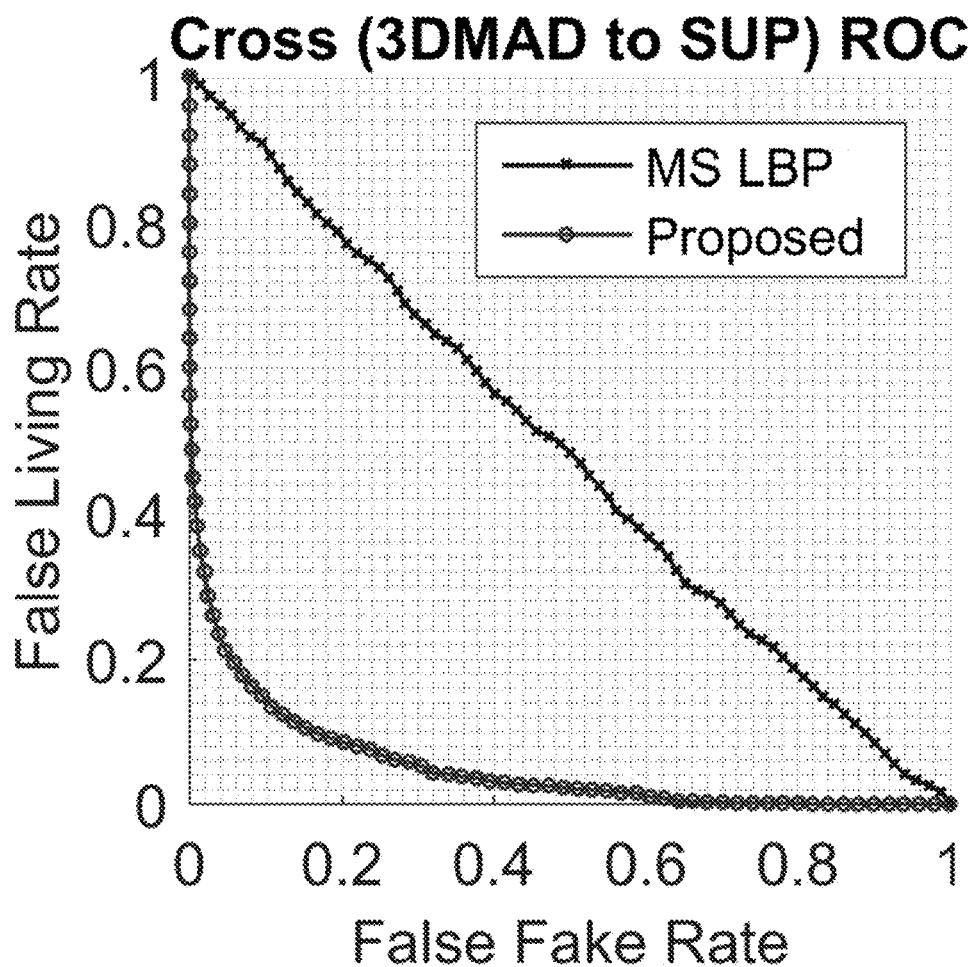
FIG. 4c shows the ROC curves under intra-database and cross-database protocol: 3D Mask Attack Database to SUPPLEMENTARY (Cross (3DMAD to SUP)). Note that the legend TF and RF means Thatsmyface.com mask and REAL-f mask.
Figure 4D:
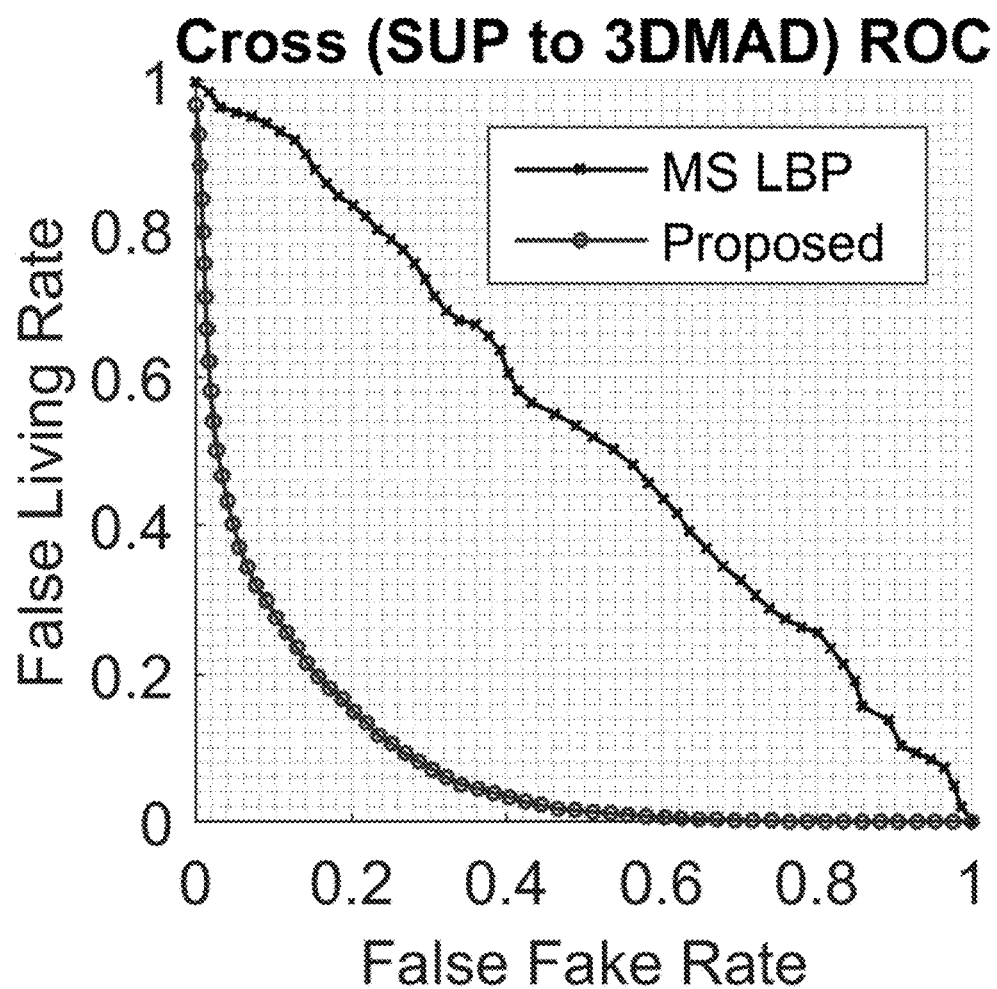
FIG. 4d shows the ROC curves under intra-database and cross-database protocol: SUPPLEMENTARY to 3D Mask Attack Database (Cross (SUP to 3DMAD)). Note that the legend TF and RF means Thatsmyface.com mask and REAL-f mask.
Figure 5A:
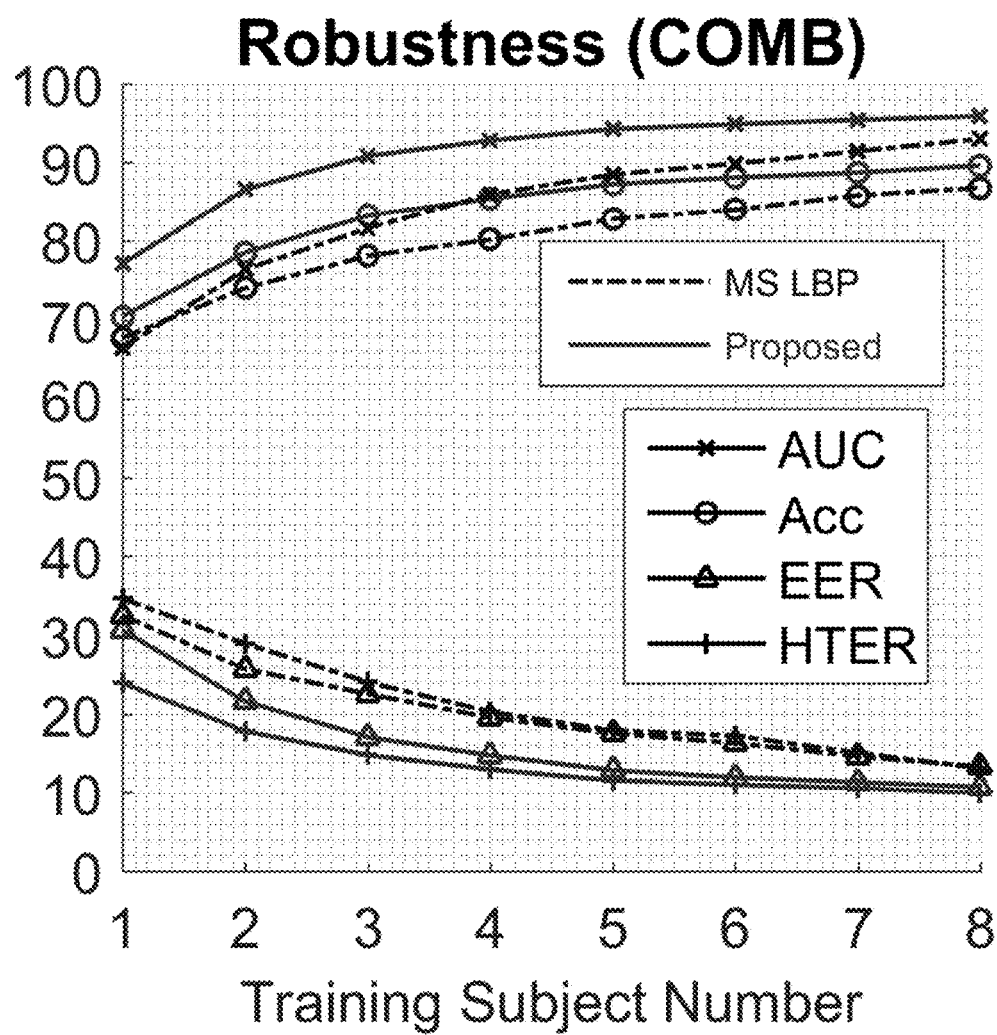
FIG. 5a shows robustness evaluation under intra-database and cross-database protocol: COMBINE (COMB) dataset.
Figure 5B:
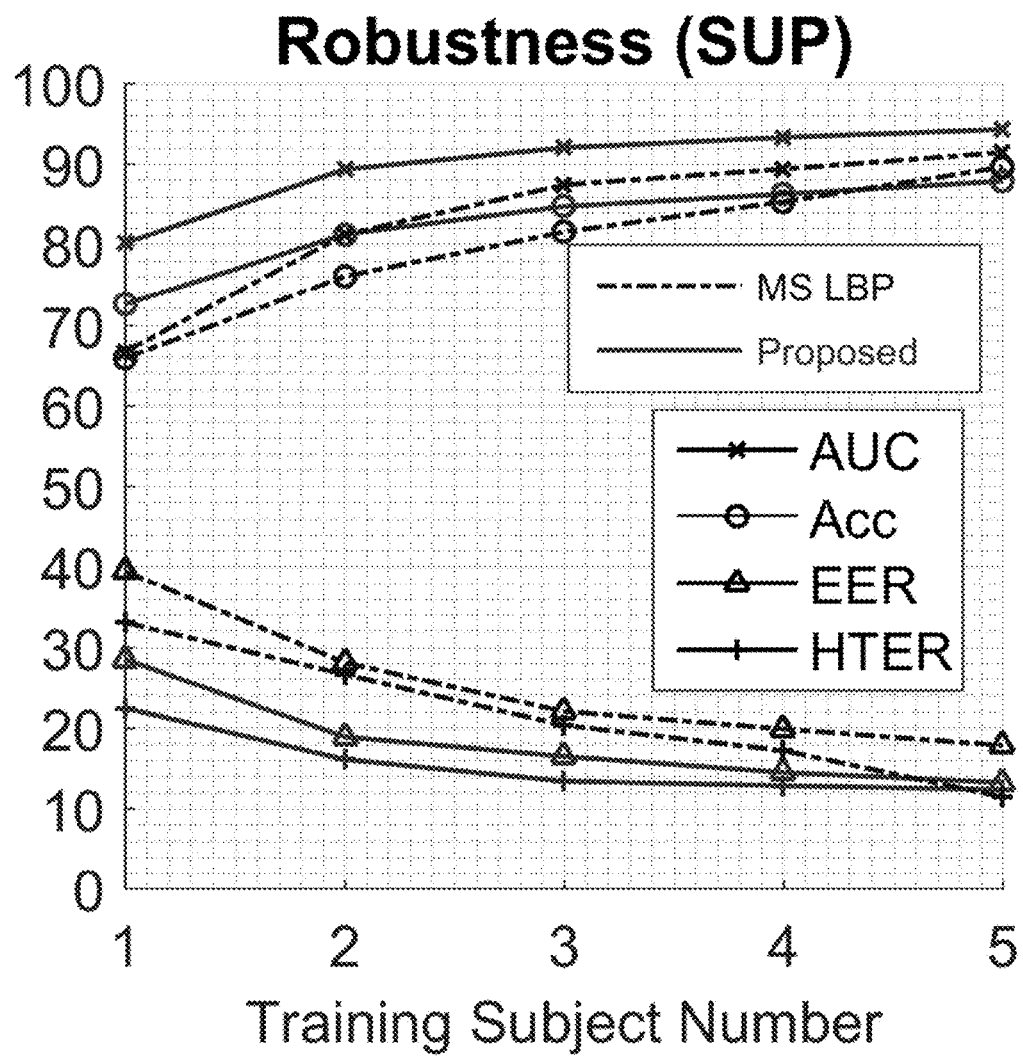
FIG. 5b shows robustness evaluation under intra-database and cross-database protocol: SUPPLEMENTARY (SUP) dataset.
Figure 5C:
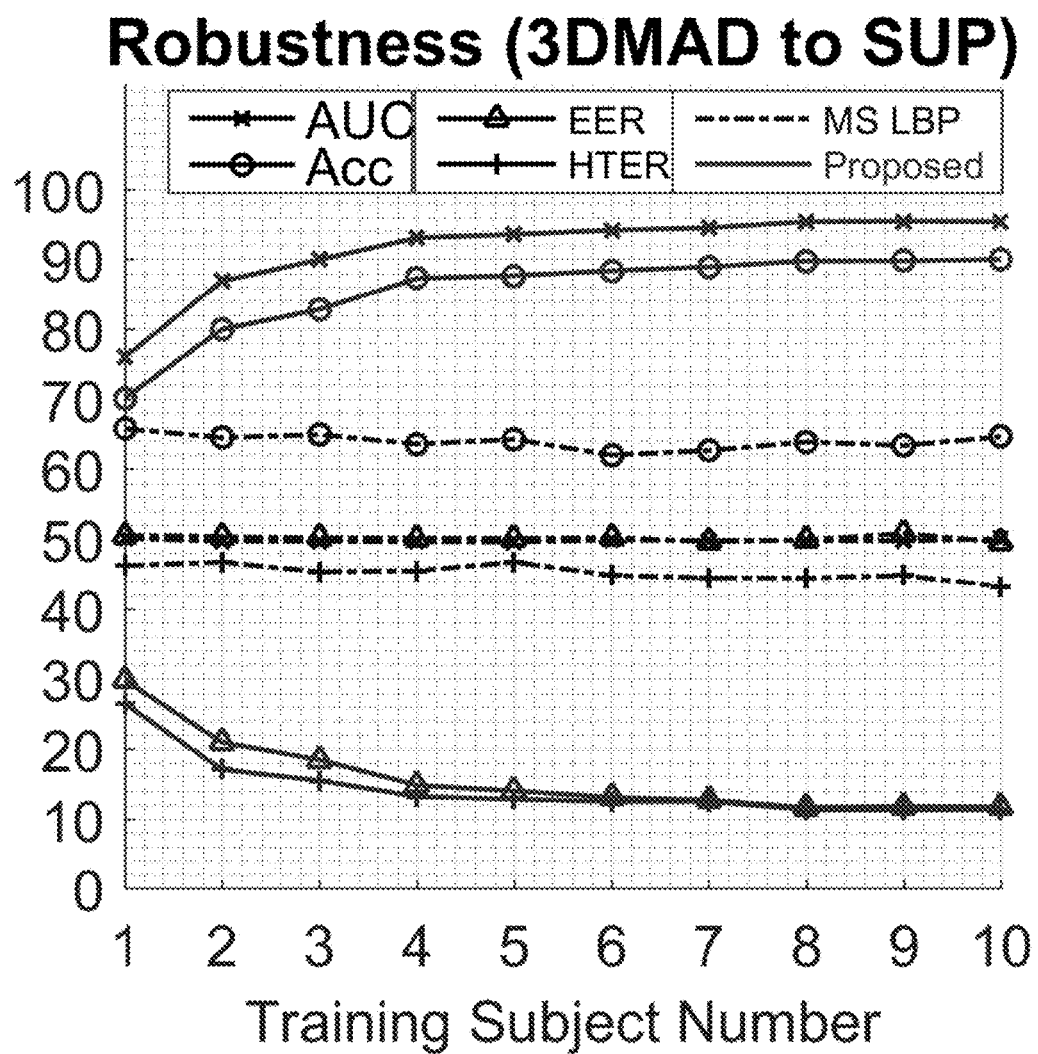
FIG. 5c shows robustness evaluation under intra-database and cross-database protocol: 3D Mask Attack Database to SUPPLEMENTARY (3DMAD to SUP).
Figure 5D:
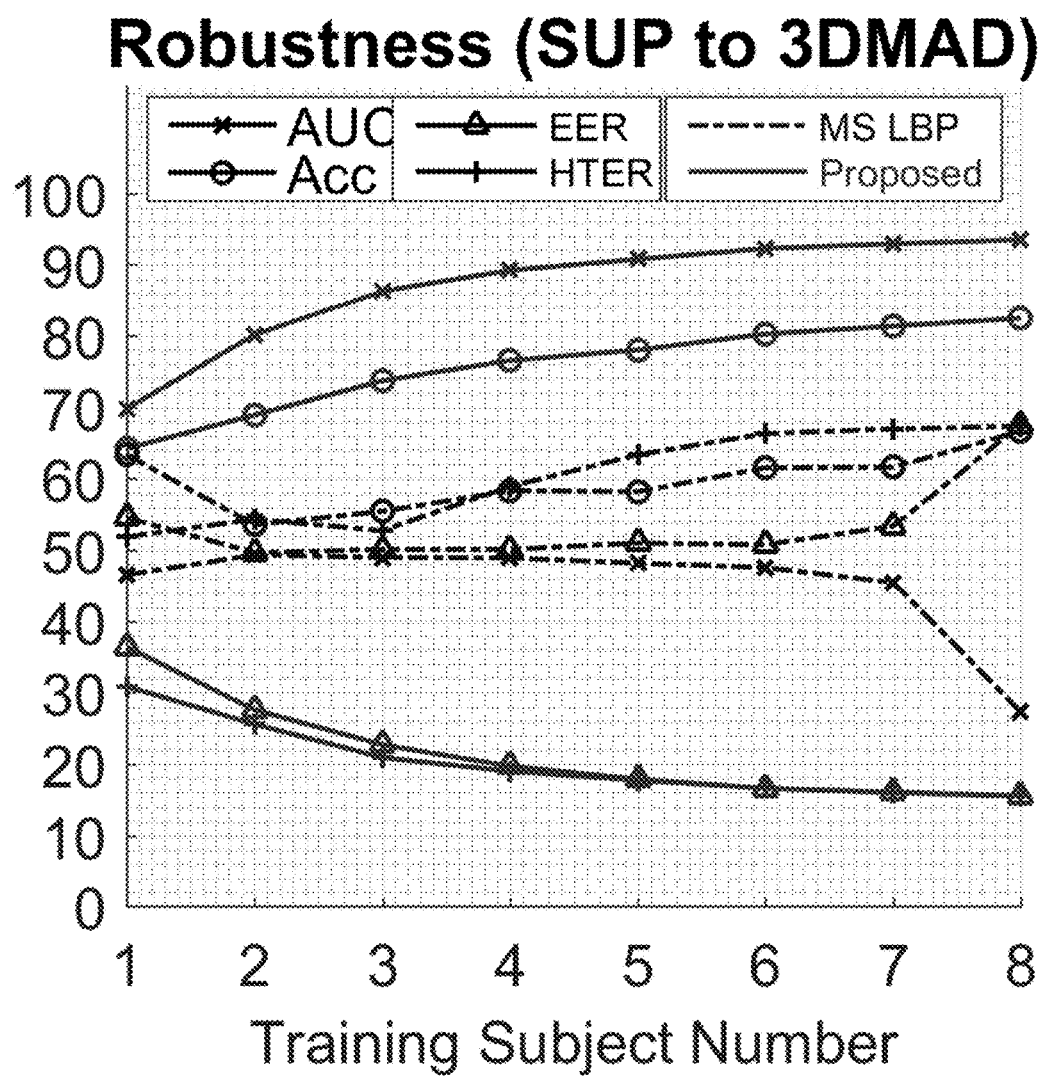
FIG. 5d shows robustness evaluation under intra-database and cross-database protocol: SUPPLEMENTARY to 3D Mask Attack Database (SUP to 3DMAD).

Through the cross-dataset experiment results given in Table 2, FIGS. 4c and 4d, robustness of the present method is demonstrated. This justifies the great adaptability of the present method when encountering different video qualities. Also, the huge performance decline of the -Multi-Scale LOCAL BINARY PATTERN illustrates over-fitting leads to weak generalization ability. Table 2, FIGS. 4c and 4d follow the same criterion in the intra-dataset evaluations so the interpretation is the same. Note that training on 3D Mask Attack Database achieves better performance than training on SUPPLEMENTARY. This may due to the dark background of the camera setting.

With different training scale settings, the robustness of the present method has been illustrated. FIGS. 5a-5d summarize the HTER EER, AUC and accuracy (Acc) while using different number of users as the training data. Except the number of training users, all other the settings are the same. As discussed in Section 5.3, for the value of HTER and EER, the smaller value the better and more accurate result; and for the value of AUC and Acc, the larger value the better and more accurate result in distinguishing masked and genuine face. The y-axis of FIGS. 5a-5d indicates the percentage value of each criterion (HTER EER AUC and Acc) and the x-axis is the number of training users. The present method achieve good performance with small training data. Specifically, the present method achieves lower HTER and EER while higher AUC and Acc than existing method. With 5 users' videos for training, the present method can almost attain the best performance. As analysed in Section 4, the local rPPG pattern has small variance along different people and thereby is simple and easy to learn. This also justifies the feasibility of using rPPG as an intrinsic cue for face anti-spoofing.

TABLE 2

Experiment results between 3D Mask Attack Database and SUPPLEMENTARY under cross-dataset test protocol.

| | 3D Mask Attack Database to SUPPLEMENTARY | | | SUPPLEMENTARY to 3D Mask Attack Database | | |
|---|---|---|---|---|---|---|
| | HTER (%) | EER (%) | AUC (%) | HTER (%) | EER (%) | AUC (%) |
| MS-LOCAL BINARY PATTERN (MS LBP, Existing method) | 46.5 ± 5.1 | 49.2 | 51 | 64.2 ± 16.7 | 51.6 | 47.3 |
| Present invention (Proposed) | 11.9 ± 2.7 | 12.3 | 94.9 | 17.4 ± 2.4 | 17.7 | 91.2 |

CONCLUSION AND DISCUSSION

In this invention, rPPG is used as an intrinsic liveness parameter for 3D mask face anti-spoofing. With the local rPPG correlation model and confidence measurement, 3D mask can be detected effectively. Promising experimental results justify the feasibility of the present method in combating 3D mask spoofing attack. Through cross-dataset experiment, the present method shows a good generalization ability.

INDUSTRIAL APPLICABILITY

The present invention relates to 3D mask face anti-spoofing method with remote photoplethysmography. More particularly, it relates to a local rPPG correlation model to extract discriminative local rPPG signal patterns so that an imposter can better be detected regardless of the material and quality of the mask.

If desired, the different functions discussed herein may be performed in a different order and/or concurrently with each other. Furthermore, if desired, one or more of the above-described functions may be optional or may be Combined.

The electronic embodiments disclosed herein may be implemented using general purpose or specialized computing devices, computer processors, or electronic circuitries including but not limited to application specific integrated circuits (ASIC), field programmable gate arrays (FPGA), and other programmable logic devices configured or programmed according to the teachings of the present disclosure. Computer instructions or software codes running in the general purpose or specialized computing devices, computer processors, or programmable logic devices can readily be prepared by practitioners skilled in the software or electronic art based on the teachings of the present disclosure.

The electronic embodiments include computer storage media having computer instructions or software codes stored therein which can be used to program computers or microprocessors to perform any of the processes of the present invention. The storage media can include, but are not limited to, floppy disks, optical discs, Blu-ray Disc, DVD, CD-ROMs, and magneto-optical disks, ROMs, RAMs, flash memory devices, or any type of media or devices suitable for storing instructions, codes, and/or data.

While the foregoing invention has been described with respect to various embodiments and examples, it is understood that other embodiments are within the scope of the present invention as expressed in the following claims and their equivalents. Moreover, the above specific examples are to be construed as merely illustrative, and not limitative of the reminder of the disclosure in any way whatsoever. Without further elaboration, it is believed that one skilled in the art can, based on the description herein, utilize the present invention to its fullest extend. All publications recited herein are hereby incorporated by reference in their entirety.

The invention claimed is:

1. A method for a 3-dimensional mask face anti-spoofing of a subject of interest comprising:
    capturing a video of a face of the subject of interest with an RGB camera configured to capture blood color variation when light is reflected or absorbed by semi-transparent human skin;
    measuring human blood flow variation caused by a heartbeat by extracting local remote photoplethysmography signals from the captured video of the face of the subject of interest to produce extracted local remote photoplethysmography signals;
    extracting the extracted local remote photoplethysmography signals through cross-correlation to produce a robust cross-correlation of the extracted local remote photoplethysmography signals for 3-dimensional mask face anti-spoofing through a union of similarity of all possible signals combination defined as $$x = U_{i,j=1,\ldots N, i \neq j} \rho(s_i, s_j)$$

where $\rho(s_i, s_1)$ is a similarity between two signals si and sj, and union U is a concatenation operator, and the similarity $\rho(s_i, s_j)$ is the maximum value of cross-correlation spectrum of two local remote photoplethysmography signals, and wherein $$\rho(s_i, s_j) = \max |\mathcal{F}\{s_i \star s_j\}|$$

where F is Fourier transform and * is a cross-correlation operator;
    learning a confidence map based on the extracted local remote photoplethysmography signals; and
    classifying the captured video of the face of the subject based on the cross-correlation of the extracted local remote photoplethysmography signals and the confidence map to determine if a 3-dimensional mask face is used.

2. The method according to claim 1 wherein the extraction of the local remote photoplethysmography signals comprises:
    detecting face landmarks on the captured video of the face of the subject;
    dividing the captured video of the face of the subject into one or more local regions; and
    extracting local remote photoplethysmography signals from said one or more local regions.

3. The method according to claim 1, wherein the learning of the confidence map comprises:
    emphasizing local regions of the video of the face which contains strong remote photoplethysmography signals;
    deemphasizing local regions of the video of the face which contain weak remote photoplethysmography signals;
    obtaining a stableness pattern of local remote photoplethysmography signals extracted from one or more training subjects;
    assigning a reliability measurement to each local regions of the video of the face according to the stableness pattern;
    producing a confidence map p of the extracted local remote photoplethysmography signals from the remote photoplethysmography signals of the one or more training subjects and the subject of interest.

4. The method according to claim 3 wherein given the confidence map p of extracted local remote photoplethysmography signals is produced, the confidence of x is measured by computing each dimensions' reliability.

5. The method according to claim 1 wherein the classification of the cross-correlation of the extracted local remote photoplethysmography signals comprises:
    employing a joint confidence q to adjust interference from feature representations of corrupted extracted local remote photoplethysmography signals.

* * * * *